United States Patent
Lukas et al.

(10) Patent No.: US 11,301,019 B2
(45) Date of Patent: Apr. 12, 2022

(54) SYSTEM ON A CHIP WITH CUSTOMIZED DATA FLOW ARCHITECTURE

(71) Applicant: University of Virginia Patent Foundation, Charlottesville, VA (US)

(72) Inventors: Christopher J. Lukas, Charlottesville, VA (US); Benton H. Calhoun, Charlottesville, VA (US); Farah B. Yahya, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 0 days.

(21) Appl. No.: 16/949,535

(22) Filed: Nov. 2, 2020

(65) Prior Publication Data
US 2021/0073153 A1 Mar. 11, 2021

Related U.S. Application Data

(62) Division of application No. 16/610,452, filed as application No. PCT/US2018/035754 on Jun. 1, 2018, now Pat. No. 10,963,408.
(Continued)

(51) Int. Cl.
*G06F 1/30* (2006.01)
*G06F 1/3215* (2019.01)
(Continued)

(52) U.S. Cl.
CPC .................. *G06F 1/30* (2013.01); *G06F 1/26* (2013.01); *G06F 1/3206* (2013.01);
(Continued)

(58) Field of Classification Search
CPC ... G06F 1/30; G06F 1/305; G06F 1/32; G06F 1/3212; G06F 1/3253; G06F 1/3287;
(Continued)

(56) References Cited

U.S. PATENT DOCUMENTS 5,630,174 A 5/1997 Stone, III et al.
6,502,159 B1 12/2002 Chuang et al.
(Continued)

FOREIGN PATENT DOCUMENTS

WO WO 2012/074360 6/2012

OTHER PUBLICATIONS

Paraskevas, Alexandros et al. "A simple maximum power point tracker for thermoelectric generators". Energy Conversion and Management. vol. 108. Jan. 15, 2016. pp. 355-365. (Year: 2016).*
(Continued)

*Primary Examiner* — Thomas J. Cleary
(74) *Attorney, Agent, or Firm* — Weaver Austin Villeneuve & Sampson LLP

(57) ABSTRACT

A system-on-a-chip (SoC) comprises a power supply circuit coupled to an energy harvesting transducer and configured to operate using energy from the energy harvesting transducer; a microcontroller coupled to a system bus of the SoC; an interface configured to communicate with the microcontroller via the system bus of the SoC, the interface configured to generate data upon occurrence of an event; and a computation accelerator configured to establish, based on an energy consumption level of the SoC, a data path between the interface and the computation accelerator that at least partially bypasses the system bus such that the data is transmitted to the computation accelerator via the data path.

20 Claims, 16 Drawing Sheets

Related U.S. Application Data

(60) Provisional application No. 62/513,546, filed on Jun. 1, 2017.

(51) Int. Cl.

| | | |
|---|---|---|
| *G06F 13/36* | (2006.01) | |
| *G06F 1/3206* | (2019.01) | |
| *G06F 1/26* | (2006.01) | |
| *G06F 11/14* | (2006.01) | |
| *G06F 9/4401* | (2018.01) | |

(52) U.S. Cl.
CPC .......... *G06F 1/3215* (2013.01); *G06F 9/4403* (2013.01); *G06F 11/1451* (2013.01); *G06F 11/1469* (2013.01); *G06F 13/36* (2013.01)

(58) Field of Classification Search
CPC ...... G06F 9/4401; G06F 9/4403; G06F 13/36; G06F 13/40; G06F 13/4022; G06F 11/1446; G06F 11/1456; G06F 11/1469; G06F 11/1471; G06F 1/24; G06F 1/26; G06F 1/3206; G06F 1/3215; G06F 11/1451
See application file for complete search history.

(56) References Cited

U.S. PATENT DOCUMENTS

| | | | |
|---|---|---|---|
| 8,947,912 | B2 | 2/2015 | Calhoun et al. |
| 9,178,518 | B2 | 11/2015 | Calhoun et al. |
| 9,325,240 | B2 | 4/2016 | Calhoun et al. |
| 9,337,204 | B2 | 5/2016 | Calhoun et al. |
| 9,350,294 | B2 | 5/2016 | Calhoun et al. |
| 9,490,698 | B2 | 11/2016 | Calhoun et al. |
| 9,590,638 | B2 | 3/2017 | Calhoun et al. |
| 9,652,570 | B1 | 5/2017 | Kathail et al. |
| 9,698,685 | B2 | 7/2017 | Calhoun et al. |
| 9,729,189 | B2 | 8/2017 | Calhoun et al. |
| 9,812,965 | B2 | 11/2017 | Calhoun et al. |
| 9,882,428 | B2 | 1/2018 | Calhoun et al. |
| 9,941,838 | B2 | 4/2018 | Calhoun et al. |
| 9,973,086 | B2 | 5/2018 | Calhoun et al. |
| 9,979,348 | B2 | 5/2018 | Calhoun et al. |
| 9,998,124 | B2 | 6/2018 | Calhoun et al. |
| 10,170,990 | B2 | 1/2019 | Calhoun et al. |
| 10,340,972 | B2 | 7/2019 | Calhoun et al. |
| 10,536,036 | B2 | 1/2020 | Calhoun et al. |
| 10,963,408 | B2 | 3/2021 | Lukas et al. |
| 2008/0238488 | A1* | 10/2008 | Comisky ................ G01R 31/40 327/20 |
| 2008/0282101 | A1 | 11/2008 | Adams |
| 2009/0037629 | A1 | 2/2009 | Rofougaran et al. |
| 2010/0321398 | A1 | 12/2010 | Kawahara |
| 2012/0159060 | A1* | 6/2012 | Yu .............. G06F 1/30 711/105 |
| 2013/0103935 | A1* | 4/2013 | Maddigan ................ G06F 1/24 713/2 |
| 2014/0160595 | A1* | 6/2014 | Chatradhi .......... G11B 19/2081 360/99.08 |
| 2015/0035378 | A1 | 2/2015 | Calhoun et al. |
| 2015/0286525 | A1 | 10/2015 | Singh et al. |
| 2015/0303975 | A1 | 10/2015 | Calhoun et al. |
| 2015/0346806 | A1* | 12/2015 | Dalal .................... G06F 9/4418 713/2 |
| 2016/0125187 | A1 | 5/2016 | Oxford |
| 2016/0170465 | A1 | 6/2016 | Flynn et al. |
| 2016/0363985 | A1* | 12/2016 | Ehmann ................. G06F 13/37 |
| 2017/0177872 | A1 | 6/2017 | McLean et al. |
| 2018/0081695 | A1* | 3/2018 | Kushwaha .......... G06F 12/0246 |
| 2018/0267591 | A1* | 9/2018 | Kurian .................. G06F 1/3212 |
| 2018/0267598 | A1* | 9/2018 | Pulivendula .......... G06F 9/4406 |
| 2019/0012484 | A1 | 1/2019 | Gulati et al. |
| 2019/0318783 | A1* | 10/2019 | Shallal ..................... G11C 5/04 |
| 2020/0065278 | A1 | 2/2020 | Lukas et al. |
| 2020/0106305 | A1 | 4/2020 | Calhoun et al. |
| 2020/0310527 | A1* | 10/2020 | Gendler ................ G06F 1/3287 |

OTHER PUBLICATIONS

Shrivastava, Aatmesh et al. "A 10 mV-Input Boost Converter With Inductor Peak Current Control and Zero Detection for Thermoelectric and Solar Energy Harvesting With 220 mV Cold-Start and 14.5 dBm, 915 MHz RF". IEEE Journal of Solid-State Circuits. vol. 50, No. 8. Aug. 2015. IEEE. pp. 1820-1832. (Year: 2015).*

Roy, Abhishek et al. "A 6.45 uW Self-Powered SoC With Integrated Energy-Harvesting Power Management and ULP Asymmetric Radios for Portable Biomedical Systems". IEEE Trnasactions on Biomedical Circuits and Systems. vol. 9, No. 6. Dec. 2015. IEEE pp. 862-872. (Year: 2015).*

Calhoun, Benton et al. "Ultra-Low Power Wireless SoCs Enabling a Batteryless IoT". 2015 IEEE Hot Chips 27 Symposium (HCS). Cupertino, CA. Aug. 2015. pp. 1-45. (Year: 2015).*

PCT International Search Report and Written Opinion dated Sep. 26, 2018, issued in Application No. PCT/US2018/035754.

PCT International Preliminary Report on Patentability dated Dec. 3, 2019, issued in Application No. PCT/US2018/035754.

U.S. Office Action dated Nov. 25, 2020 issued in U.S. Appl. No. 16/610,452.

U.S. Notice of Allowance dated Dec. 31, 2020 issued in U.S. Appl. No. 16/610,452.

\* cited by examiner

SYSTEM ON A CHIP WITH CUSTOMIZED DATA FLOW ARCHITECTURE

STATEMENT OF GOVERNMENTAL SUPPORT

This invention was made with government support under Grant No. 2012-1067-02 a subaward of EEC-1160483 awarded by the National Science Foundation. The government has certain rights in the invention.

INCORPORATION BY REFERENCE

An Application Data Sheet is filed concurrently with this specification as part of this application. Each application to which this application claims benefit or priority as identified in the concurrently filed Application Data Sheet is incorporated by reference herein in its entirety and for all purposes.

BACKGROUND

For internet-of-things (IoT) applications, there is a need for ultra low power (ULP) devices that are capable of providing monitoring, sensing, control, and/or security functions. The use of battery-powered systems, however, can be a challenge in IoT applications due to the limited number of battery recharge cycles and the huge scale and cost of battery replacement. Further, there may be severe constraints on size, power consumption, or environmental survivability of devices being used in such applications. As such, battery-less self-powered integrated ULP systems and devices are expected to play larger roles in IoT applications.

SUMMARY

Figure 1A:
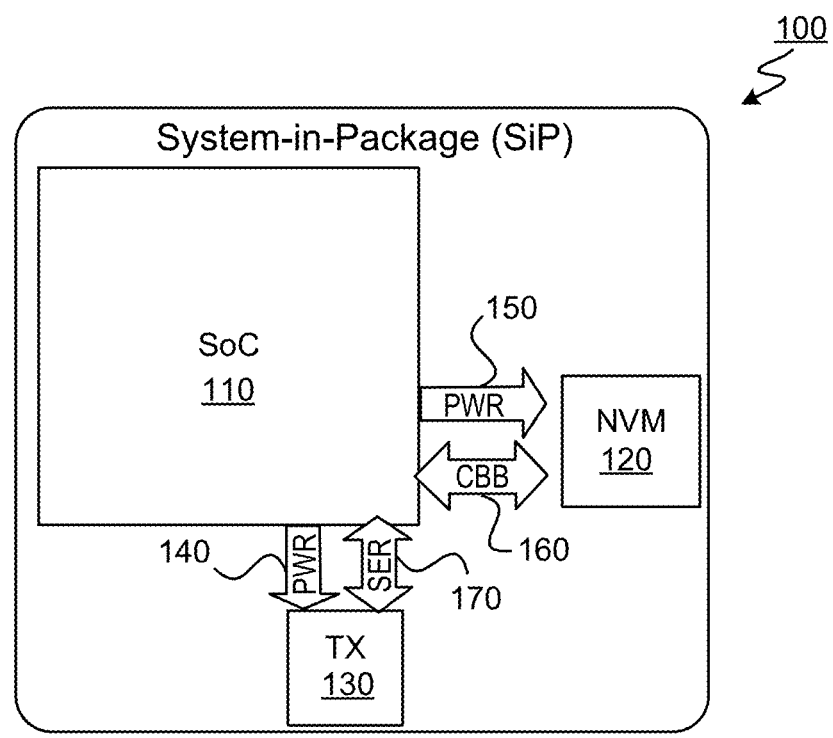
FIG. 1A is an example illustration of a system-in-package (SiP) including a system-on-chip (SoC) coupled to an external memory and a communications system, according to an embodiment.

Some embodiments of the current disclosure disclose a system-on-a-chip (SoC) comprising a power supply circuit coupled to an energy harvesting transducer and configured to operate using energy from the energy harvesting transducer; a microcontroller coupled to a system bus of the SoC; an interface configured to communicate with the microcontroller via the system bus of the SoC, the interface configured to generate data upon occurrence of an event; and a computation accelerator configured to establish, based on an energy consumption level of the SoC, a data path between the interface and the computation accelerator that at least partially bypasses the system bus such that the data is transmitted to the computation accelerator via the data path. In some embodiments, the SoC may further comprise a power management circuit operatively coupled to the power supply circuit and the microcontroller, the power management circuit configured to select the energy consumption level of the SoC based on an available amount of the energy from the energy harvesting transducer. In some embodiments, the power management circuit, operatively coupled to the power supply circuit and/or the microcontroller, may be configured to establish an operational mode for the SoC based on the energy consumption level. In some embodiments, the data path is reconfigurable during an operation of the SoC.

In some embodiments, the interface is configured to generate the data upon receipt of a data signal from a sensor; and the computation accelerator is further configured to at least process the data generated by the interface to obtain information about the event. In some embodiments, the SoC is battery-less. In some embodiments, the energy harvesting transducer includes a thermoelectric generator, a photovoltaic cell and/or a piezo energy harvester.

In some embodiments, the SoC may further comprise a maximum-power-point tracking circuit, operatively coupled to the power supply circuit, configured to track a maximum power point of the thermoelectric generator to operate the power management circuit at the maximum power point. In some embodiments, the microcontroller is configured to enter a low power mode during at least a portion of one or more of the generation of the data by the interface, the transmission of the data via the data path and a processing of the data by the computation accelerator.

In some embodiments, the SoC may further comprise a radio interface configured to interface with a radio transmitter, wherein the computation accelerator is configured to process the data received from the interface by compressing the data prior to sending the data to the radio interface for transmission by the radio transmitter. In some embodiments, the computation accelerator is configured to establish a second data path between the computation accelerator and the radio interface that at least partially bypasses the system bus such that the data received at the computation accelerator, after processing by the computation accelerator, is transmitted to the radio interface via the second data path.

In some embodiments, an SIP may include the SoC disclosed herein, a radio transmitter and the radio interface.

Some embodiments of the current disclosure disclose a microcontroller configured to select data and/or instruction from the SoC for off-chip storage when an amount of energy available for SoC operation is less than a threshold amount of energy; and a cold boot management system (CBMS) operatively coupled to the microcontroller and including a cold boot controller and a cold boot bus. In some embodiments, the energy available for operation of the SoC is obtained from an energy harvesting transducer. In some embodiments, the cold boot controller is configured to: send the data and/or instruction to an external memory for off-chip storage during a backup sequence of the SoC; and retrieve at least some of the stored data and/or instruction from the external memory during a boot up sequence of the SoC. In some embodiments, the cold boot controller is further configured to one or both of (1) send the data and/or instruction to the external memory and (2) retrieve at least some of the stored data and/or instruction from the external memory, via the cold boot bus. In some embodiments, the microcontroller is configured to enter a low power mode during at least a portion of one or more of the cold boot controller sending the data and/or instruction and the cold boot controller retrieving the at least some of the stored data and/or instruction. In some embodiments, the power management circuit may be configured to monitor the amount of energy available for operation of the SoC.

In some embodiments, the CMBS is configured to: power the external memory prior to a start of the backup sequence; discontinue providing power to the external memory after the data and/or instruction are saved by the external memory; power the external memory prior to a start of the boot up sequence; and discontinue providing power to the external memory after the at least some of the stored data and/or instruction are retrieved from the external memory.

In some embodiments, the SoC comprising the CMBS further comprises an energy supply circuit including: a plurality of outputs, each output from the plurality of outputs configured to provide a supply voltage to a component of the SOC and/or an off-chip component coupled thereto, wherein at least one supply voltage of the plurality of outputs being different from another supply voltage of the plurality of outputs. Further, the CBMS may be configured to select i) which supply voltage to enable, and ii) a temporal order for enabling the selected supply voltages, during the boot up sequence based on a second amount of energy available for the boot up sequence.

Some embodiments of the current disclosure disclose a SiP comprising the SoC as disclosed herein; a radio transmitter; an external non-volatile memory (NVM); a radio interface configured to interface with the radio transmitter, and the cold boot management system (CBMS) operatively coupled to the external non-volatile memory (NVM) via a cold boot bus.

DETAILED DESCRIPTION

Some embodiments of the present disclosure include a SiP that is configured to operate on limited power budget for an extended period of time. For example, the SiP may be a battery-less system that includes energy transducers such as, but not limited to, piezo energy harvesters, photovoltaic (PV) cells and thermo-electric generators (TEGs) that harvest energy from ambient vibrations, solar sources and thermal gradients, respectively. In some embodiments, the SiP may comprise a radio transmitter (TX), a memory (e.g., a non-volatile memory (NVM)) and a SoC that includes SiP interfaces that allow for compact integration of the SoC with the TX and the NVM. In such embodiments, the compact design of the SiP and/or the SoC facilitates a significant reduction in the SiP's power consumption as well as form factor, the former by improving the system's lifetime and the latter by reducing the size of the harvesting devices, for example. The power consumption of the SoC may further be reduced with the use of a power manager (PM) included in the SoC that monitors the available energy from the energy transducers and adapts the system's power consumption to the varying energy harvesting conditions. The power manager may also arrange for a recovery of the SoC after a complete power loss using an SiP interface with a NVM.

In some embodiments, the SoC may include a fully integrated Energy Harvesting Platform Power Manager (EH-PPM) to power the SoC and peripheral components (e.g., commercial off the shelf (COTS) chips) as well as custom chips and sensors. For example, the EH-PPM can avail a plurality of voltage rails to provide varying amounts of supply voltages to different coupled as well as internal components. For example, the EH-PPM may have three voltage rails supplying 0.5V, 1V and 1.8V to, respectively, digital components onboard the SoC, the radio transmitter and COTS sensors, the latter two of which are externally coupled to the SoC. Further, the SoC can also include an Analog Front End (AFE) for ECG signal acquisition, a Cold-Boot Management System (CBMS) for backing up of data, and for booting and recovery from NVM, general purpose timers, an FIR filter, and/or a MAC unit for data processing.

In some embodiments, the SoC may also include multiple accelerators that are tightly integrated with generic blocks to create a custom data-flow that reduces the code size and number of memory accesses required to perform an operation. Such data-flow architecture can significantly reduce the system's power consumption. For example, accelerators can be tightly integrated with the block using the accelerators to eliminate or significantly reduce the need for direct memory access. For example, the compression accelerator (e.g., executing the lossless entropy compression algorithm GAS-LEC) can be integrated in the communication interface (e.g., radio interface (RI)) to lower communication costs. Similarly, the heart rate and atrial fibrillation (RR-AFIB) monitor can be integrated with the ECG front end (e.g., to operate in sub-threshold for low power) which, in some instances, may occur without direct access to the memory, thereby reducing the energy cost associated with accessing the memory. In some embodiments, the data-flow architecture may also include dedicated data paths between accelerators and various interfaces such as the communication interfaces, the sensor interfaces, etc., so as to avoid the transmission of data/system instructions via the system bus of the SoC. For example, an accelerator may set up a data path between itself and a sensor interface to receive data from the interface about an event sensed by the sensor. The bypassing of the system bus contributes to the general reduction of power consumption by the SoC since the microcontroller would not need to access the system bus for the transmission of the data when the data is being transmitted over the data path.

FIG. 1A presents an example illustration of a system-in-package (SiP) 100 including a system-on-chip (SoC) 110 coupled to an external memory (e.g., NVM) 120 and a communications system (e.g., radio transmitter) 130, according to an embodiment. In some embodiments, it may be desirable to have a reliable backup system in battery-less systems, since the harvested energy may not be consistent and may have a varying profile by its very nature. For example, photovoltaic cells may be depleted and may cease to provide energy to be harvested if solar power is not available for an extended period of time. In such embodiments, the NVM 120 can be used as a backup resource to facilitate system backup and recovery. For example, the SoC 110 may have a cold boot management system (CBMS) that manages the backing up of data and/or system (e.g., microcontroller) instructions to the NVM 120 prior to the power-down of the SoC 110. In some embodiments, the CBMS may also facilitate the boot-up of the SoC 110 by retrieving the stored data/instructions from the NVM 120 to boot up the SoC 110 after power outage.

The transmission of the data/instructions to and from the NVM 120 may occur via a cold boot bus (CBB) 160, a parallel interface configured to reduce the communication cost (e.g., in terms of power usage) between the NVM 120 and the SoC 110 without compromising the system's area or size. This can be beneficial since the energy that is available or is at the disposal of the SoC is usually low when the backing up process is initiated, and the reduction in the communication cost due to the utilization of the CBB 160 may contribute to the conservation of this low energy supply to facilitate the completion of the backing up process prior to energy depletion. In some embodiments, the CBB 160 can also mitigate the power consumption of the NVM 120 by reducing the on-time of the NVM 120. This may lead to a decrease in the system's total power budget (since the operations of the NVM 120 may be powered by the SoC 110, e.g., 150). While storing the data/instructions from the SoC 110, the NVM 120 may be idle, consuming little or no power. In some embodiments, the NVM 120 can be designed with the SoC 110 using a ferro-electric 130 nm process that allows for the development of low-power ferro-electric based NVM. In example implementations of the SiP 100 including an SoC 110 recovering from a power loss and an NVM 120 communicating with the SoC 110 via a CBB 160, the CBB could recover data/instructions from the NVM 120 within about 65 ms while consuming as low as about 4.12 µW power.

In addition to the NVM 120, in some embodiments, the SiP 100 may include a communications circuit 130 such as a radio transmitter (e.g., frequency shift keying (FSK) transmitter such as but not limited to an FSK transmitter developed in a commercial low power 65 nm technology, a technology that may facilitate the development of a transmitter compatible with the BLE standard for non-connectable advertisement). The SoC 110 may comprise a radio interface (e.g., dedicated serial interface) allowing the SoC 110 to communicate with the communications circuit 130, and further control, i.e., reduce the on-time of the circuit 130. The use of a low power communications circuit 130 and/or a reduced on-time may mitigate the power consumption level of the communications circuit 130. For example, in an example implementation, of a data transmit operation, the FSK transmitter can consume as low as about 724 µW.

Figure 1B:
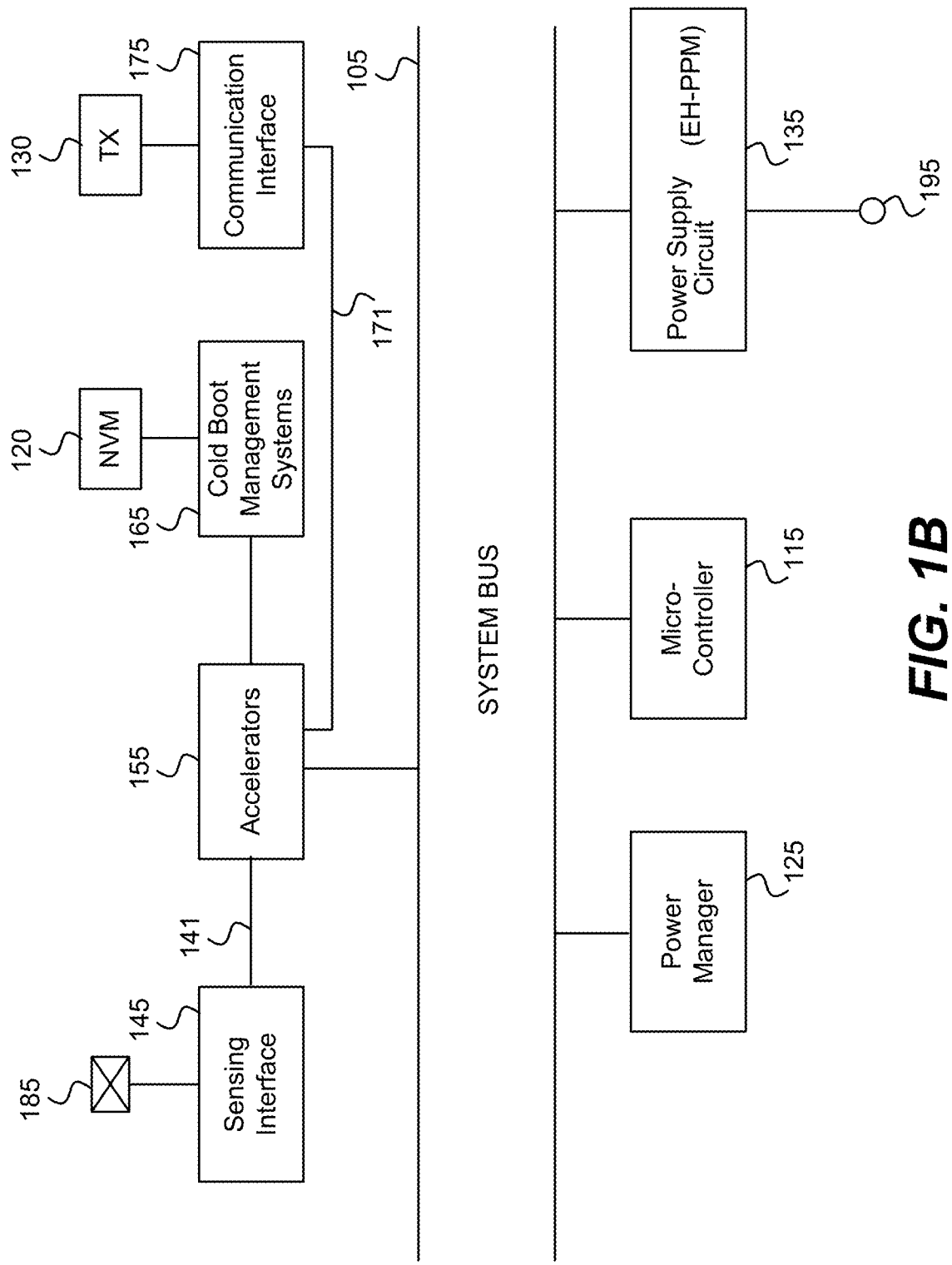
FIG. 1B is a system block diagram of the integrated self-powered SoC, according to an embodiment.

FIG. 1B is a system block diagram of the integrated self-powered SoC, according to an embodiment. The building blocks of the SoC include a sensing interface 145 that is configured to interface with a sensor 185 and generate data upon the sensing of an event occurrence by the sensor 185. For example, the sensor 185 can be an RF sensor configured to receive RF input signals from an external transceiver. As another example, the sensor 185 may be configured to receive input signals from adjacent devices with an interrupt command or request, which is then relayed to the microcontroller 115 and/or a computation accelerator 155 via the sensing interface 145. For example, the SiP or SoC may be in a low power mode (e.g., sleep mode, etc.) and a sensor 185 may receive an interrupt instruction or request to wake the SoC out of the low power mode, and the sensor 185 may route the instruction or request to the microcontroller 115 and/or a computation accelerator 155, along with the gathered data.

Similarly, the SoC may include a communications interface 175 that is configured to interface with the communications circuit 130 such a radio transmitter to transmit data from the SoC to an external device. For example, ECG sensor data obtained by a sensor 185 may be processed (e.g., compressed) by one or more of the computation accelerators 155 before being routed to the communications circuit 130 for transmission to an external server. Flexible custom interfaces allow the SoC to communicate efficiently with SiP components (e.g., off-chip components) and reduce their power.

Another building block of the SoC can be a power supply circuit such as the aforementioned EH-PPM 135 that is coupled to an energy harvesting transducer 195 and configured to operate using energy obtained from the energy harvesting transducer 195 to power onboard and externally coupled components of the SoC. For example, the EH-PPM 135 can harvest energy from an energy harvesting transducer 195 such as but not limited to piezo energy harvesters, photovoltaic (PV) cells and thermo-electric generators (TEGs) into a super-capacitor and regulate the super-capacitor to supply the SoC (and its various components or blocks therein) as well as off-chip (i.e., externally coupled) components such as the NVM 120, communications circuit 130, sensors 185 while drawing low quiescent current. In some embodiments, the quiescent current can be as low as about 400 nA. The SoC may also include a maximum-power-point tracking circuit (not shown) that is coupled to the EH-PPM 135 (e.g., to the boost converter 310 of the EH-PPM 300 in FIG. 3) and/or the power manager 125 and configured to track a maximum power point of the TEG to operate the power management circuit and/or the power manager 125 at the maximum power point.

The SoC also includes the power manager (PM) 125 which is configured for monitoring the energy available to the system (the SoC and/or the SiP) and managing the backing up of at least critical data and the system booting up sequence when the available energy supply is too low to sustain system operations (i.e., the available energy is not much more than what would be needed to back up the data, for example). The PM 125 manages the backing up and the booting up sequences with the aid of the cold boot management system (CBMS) 165 that is coupled to the non-volatile memory (NVM) 120. For example, upon the PM 125 determining that the available power supply is too low to sustain operations for much longer (for example, a power loss is imminent), the PM 125 may communicate with the CBMS 165 so that the CBMS 165 sends data and/or instructions to the NVM 120 for off-chip storage during a backup sequence of the SOC. Once power becomes available, the PM may once again communicate with the CBMS 165 so that the CBMS 165 retrieves at least some of the stored data/instructions from the NVM 120 to initiate the booting up sequence. In some embodiments, only select components may be powered up initially based on the amount of power that has become available. For example, power hungry and/or external off-chip components may be powered up after more essential and/or less power hungry components are initialized. This may be effected by allowing a sequenced turn-on of the different regulators power to the different components before the rest of the system (i.e., SoC) is enabled. For example, in some embodiments, the CBMS or a power-on circuit may establish a temporal order for powering different components during a bootup processes (e.g., by having the temporal order for enabling the regulators), thereby effecting a sequenced turn-on of various components. In this manner, the PM 125 is configured to avoid a death loop for the SoC when there is only enough energy to boot up some of the components of the SoC but not enough energy for a complete boot up process.

The data-flow architecture of the SoC in FIG. 1B is configured to lower the overall power consumption of the system by allowing communication between different components of the SoC via dedicated data paths, thereby bypassing the more energy intensive use of the system bus 105. For example, when the available energy of the SoC is low (e.g., the energy supply circuit 135 indicates that the available energy from a harvesting transducer 195 is too low for normal operations), an accelerator 155 may establish a data path 141 between the accelerator 155 and a sensing interface 145 based on the available energy (i.e., the consumption level for transporting data between the accelerator 155 and a sensing interface 145) to receive data generated by the sensing interface 145. The data may entirely bypass the system bus 105 or may bypass the system bus 105 at least partially. The bypassing of the system bus 105 reduces or eliminates the direct involvement of the microcontroller 115 in the transport of the data, thereby reducing the overall power consumption of the system since the microcontroller and its operations tends to be power hungry. Similarly, the accelerator 155 may establish data paths with other components of the SoC, such as an accelerator 155 establishing a data path 171 to the communications interface 175 that at least partially bypasses the system bus 105 (thereby bypassing the normal full involvement of the microcontroller 115 as well, for example). For example, an application specific computation accelerator such as an AFIB accelerator may receive data from an ECG sensor and process (e.g., digitize, analyze, etc.) the data to detect atrial fibrillation indicators, which the AFIB accelerator then transmits to the communications interface 175 via the path data path 171 that is established by the AFIB accelerator due to and based on the low energy supply and the energy consumption level of the system (e.g., SoC).

Figure 2A:
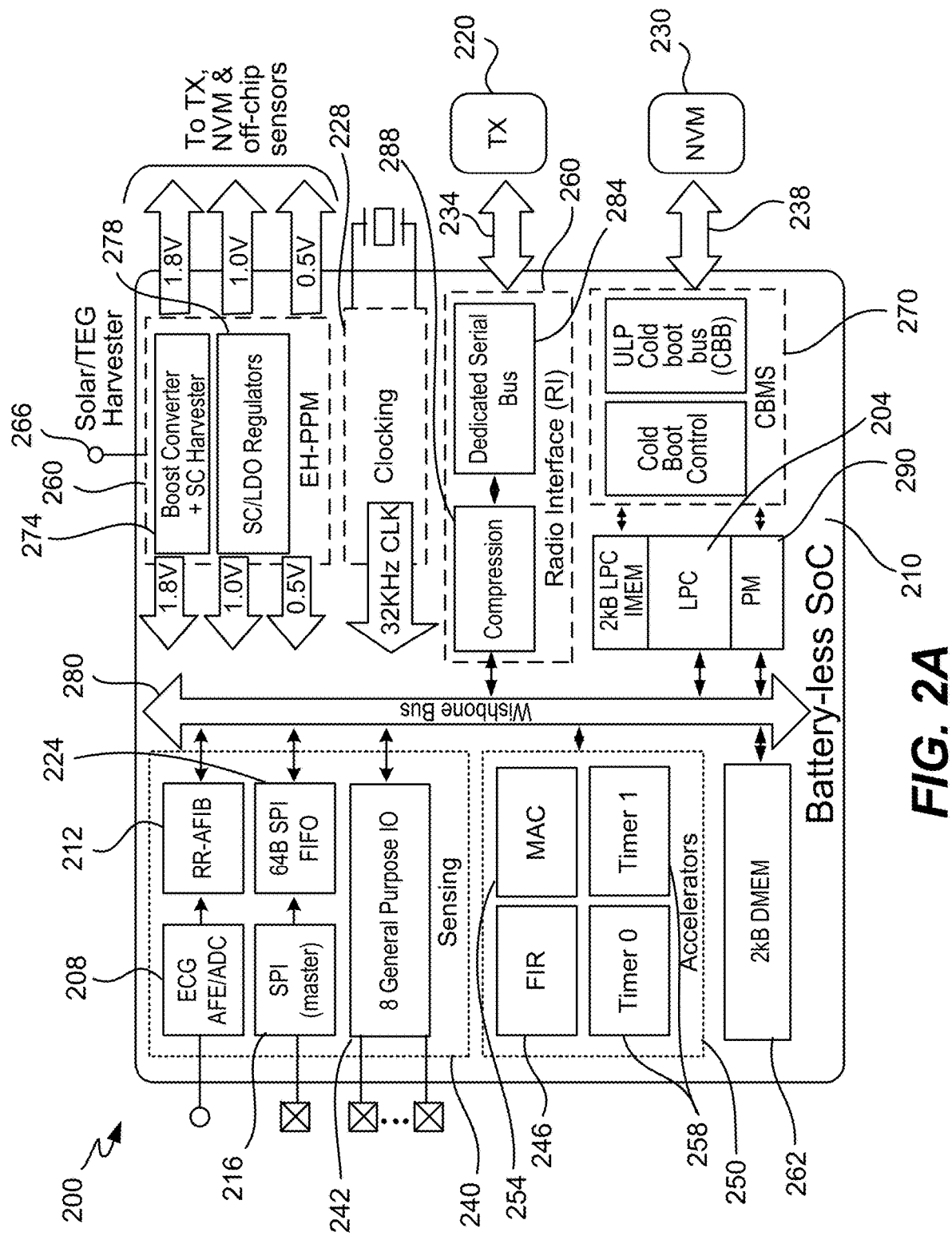
FIG. 2A is a system block diagram of the integrated self-powered SoC, according to an embodiment.
Figure 2B:
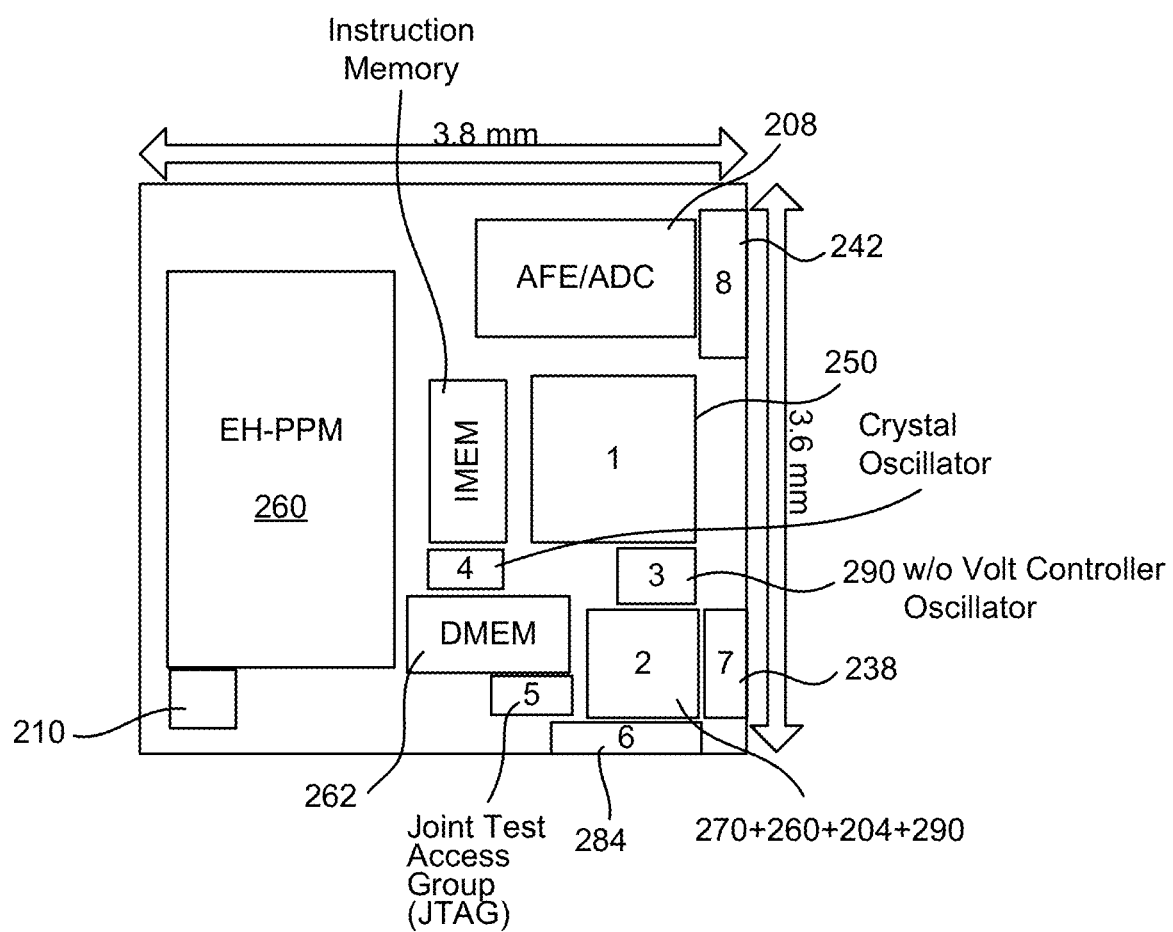
FIG. 2B is an annotated schematic of an integrated self-powered SoC including a plurality of components contained therein, according to an embodiment.

In some embodiments, FIG. 2A shows another block diagram embodiment of the SiP 200 disclosed herein including main building blocks such as the SoC 210, NVM 230 and TX 220. FIG. 2B shows an annotated schematic of the SoC 210. The SoC 210 includes the EH-PPM 260, the PM 290 with a cold-boot management system (CBMS) 270, an analog (ECG AFE with 12-bit ADC) sensing interface 208 and two digital (SPI, GPIO) sensing interfaces 224, a custom low power controller (LPC) 204, one or more hardware accelerators 250, and an ULP oscillator 228 (e.g., a 32 KHz oscillator). To achieve sub-µW power consumption, the various blocks or components may be co-designed and tightly integrated to achieve at least substantially seamless data-flow without compromising the ability of the SiP to perform its tasks. For example, as discussed above, different accelerators 250 can be tightly integrated with the various blocks using the accelerators 250 to create a custom data-flow architecture that reduces the code size (required memory) and number of memory accesses used to perform an operation. Further, this data-flow architecture facilitates the significant reduction of the system's power consumption and use of a single main low power controller (LPC) 204 for both software and memory management (e.g., direct memory access (DMA)). For example, the LPC 204 can act as the master of a shared wishbone bus 280, with one or more of the accelerators 250 acting as slaves. In some embodiments, the custom data-flow architecture also includes the establishment of data paths to transmit/receive data between the accelerators 250 and the components or noted blocks that use the accelerators 250. These data paths, such as data paths 141 and 171 shown in FIG. 1B (not shown in FIG. 2A) can at least partially bypass the wishbone system bus 280, which reduces not only memory access by the LPC 204 but also the LPC's 204 access of the system bus 280 (since the LPC 204 won't be at least fully involved in the transmission of the data), which results in significant reduction of system power consumption.

The system bus 280 can be used to interface with sensing interface 240 and general and specific function accelerators 250. In some embodiments, the system bus 280 may also interface with the custom SiP buses that couple the SoC (or blocks or components therein) with off-chip components, such SiP buses including the cold boot bus (CBB) 238 and a communications bus 234 coupling the communications interface (e.g., the radio interface (RI)) 260 to the communications interface (e.g., radio transmitter) 220. As shown in the example embodiment of FIG. 2A, the system bus 280 interfaces with 3 sensor interfaces, 5 general use accelerators, 2 application specific accelerators, and 2 custom SiP buses for interfacing with the radio transmitter 220 and nonvolatile memory 230. The sensing interfaces include the ECG analog front end (AFE) with integrated ADC 208, a SPI master for interfacing with COTS sensors 224, and 8 general purpose input output (GPIO) pins 242 for interfacing with custom sensors, including two interrupts for waking up the system upon an occurrence of an event.

As noted above, in some embodiments, the computation accelerators 250 may comprise general purpose accelerators as well application specific accelerators. For example, the general-purpose accelerators may include a finite impulse response (FIR) filter 246 and a multiply-accumulate (MAC) unit 254 for signal processing, a plurality of timers (e.g., two) 258 for periodic sensing and sleeping, as well as a compression block 262 for reducing DMEM utilization and radio transmission time. The application specific accelerators may include the RR block for measuring R-R intervals (e.g., heart period) and the AFIB block for detecting atrial fibrillation from digitized ECG data, e.g., 212. In some embodiments, the application specific computation accelerators such as but not limited to the RR computation accelerator and the AFib computation accelerator may be integrated (e.g., physically) with the respective sensing interface. For example, the RR block and the AFib block may be integrated with the sensing interface 240, in particular with an ECG sensor interface 208.

The SoC 210 may also include a power supply circuit, i.e., an energy-harvesting platform power manager (EH-PPM) 260 that is configured to power the SiP chips while drawing very low operating current. The EH-PPM 260 may harvest energy from an energy harvesting transducer 266 (e.g., PV, TEG, piezo harvester). For example, the EH-PPM 260 may harvest energy from these energy harvesting transducer 266 using either a single-inductor boost converter with maximum power point tracking (MPPT) control or a fully integrated (e.g., no external passives) voltage doubling switched-cap harvester, e.g., 274. The EH-PPM also includes three fully integrated regulators 278 to power the different component of the SiP (SoC, NVM, and TX) as well as off-chip sensors. The regulators can be specifically designed to reduce their $I_{DDQ}$ currents and handle sub-µW loads.

In some embodiments, the SoC 210 may also include a power manager (PM) 290 that is configured to keep track of the available energy in the system and adjusts the system's operation so as to remain within the power budget of the energy harvesting transducer 266 and also improve the system's lifetime. The PM 290 can also tightly integrate with the Cold-Boot Management System (CBMS) 270 to save at least critical data and recover from power loss. The CBMS 270 also allows integration of the SoC 210 with a ULP NVM 230 to create a wearable, self-powered system capable of recovery from programmable memory. In some embodiments, the CBMS 270 may utilize an in-package Cold-Boot Bus (CBB) 238 to minimize energy and power cost of recovering from NVM 230. For example, the CBMS 270 may utilize the CBB 238 to transmit and/or receive data without or with little involvement of the onboard memory or the LPC 204, which reduces the system power consumption that would have occurred without the use of the CBB to transmit and/or receive the data.

In some embodiments, the SoC 210 may also include a communications interface 260 such as a radio interface (RI) to manage wireless transmissions of sensor data to a base-station. The dedicated serial interface 260 minimizes radio on-time by customizing the power up, configuration, and radio transmission for minimal data transfer on the RI bus 284. Further, the SoC 210 contains a compression block 288 to reduce the data transmitted over the radio. Reducing the data size results in fewer packets, allowing the radio to turn off sooner or improve its duty cycle. In some embodiments, the compression block 288 may be tightly integrated with the communications interface 260, i.e., the compression block 288 may be part of the communications interface 260. In some embodiments, the compression block may not be part of the communications interface 260 but may be closely integrated enough to allow the establishment of a data path to the communications interface 260 and/or to the dedicated serial radio bus 284 bypassing the system bus 280.

Figure 3:
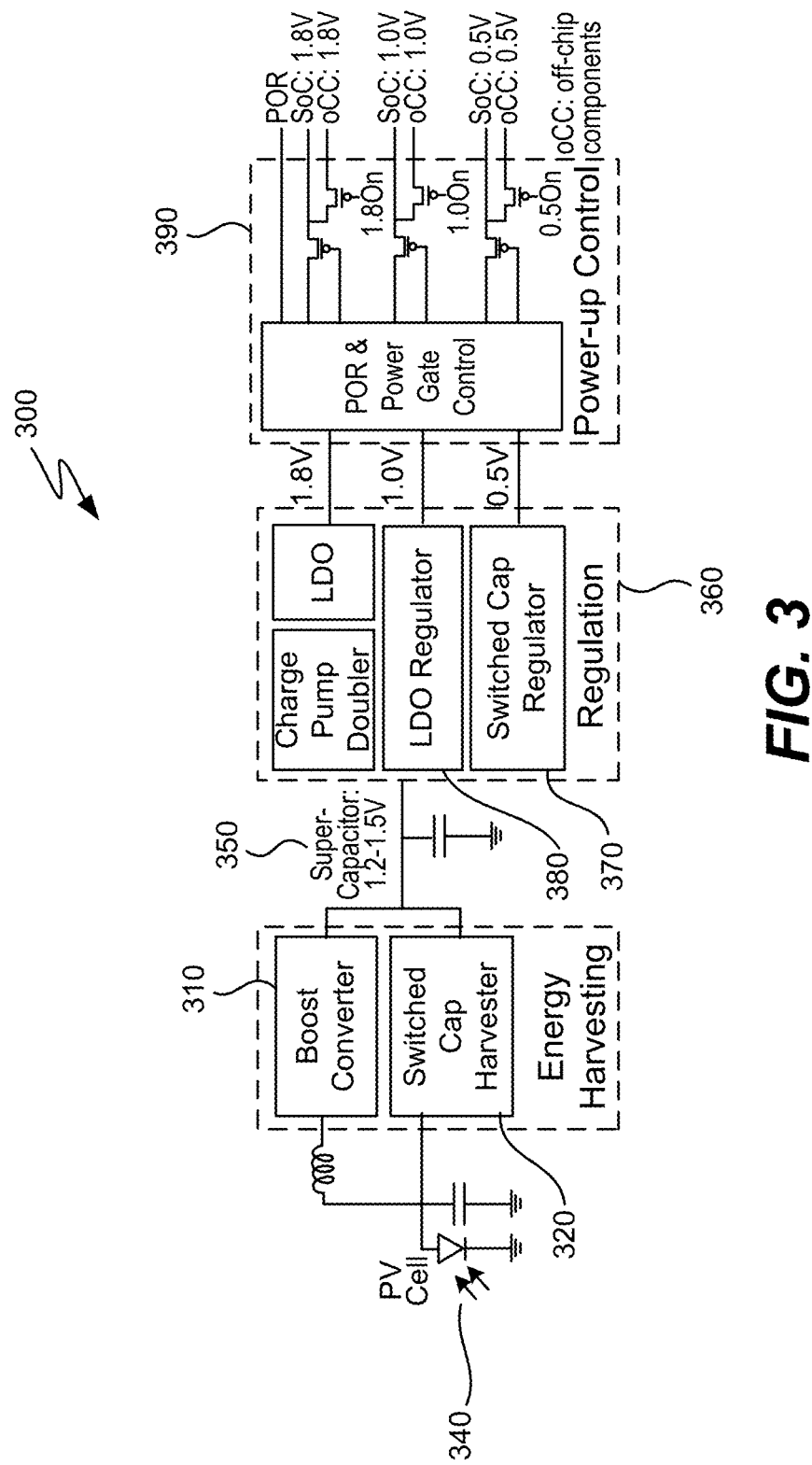
FIG. 3 is an example illustration of the power supply circuit of the SoC disclosed herein, according to an embodiment.

FIG. 3 is an example illustration of the power supply circuit (i.e., the energy-harvesting platform power manager (EH-PPM)) of the SoC disclosed herein, according to an embodiment. In some embodiments, for the SiP to be autonomous (including battery-less, for example), energy harvesting and power management circuits may be used to support the SoC as well as any peripheral sensors. For example, a low quiescent-current, high-efficiency power supply circuit (i.e., EH-PPM)) 300 can be used to improve the lifetime of the system while leaving less cumbersome footprint in terms of contribution to the form-factor of the SiP system. Wearable systems in particular can use an SiP that can operate for an extended period of time on a limited energy budget while contributing little to the form factor of the wearable devices. In some embodiments, such long life time/limited form factor may better be achieved with the use of integrated regulators to deliver power compared to, for example, inductors.

In some embodiments, the EH-PPM 300 can power the SiP chips while drawing very low operating current. The EH-PPM 300 may harvest from an energy harvesting transducer 340 (such as but not limited to photovoltaic cells, piezo energy harvesters, thermoelectric generators (TEG), etc.) using either a single-inductor boost converter 310 with maximum power point tracking (MPPT) control and/or a fully integrated (no external passives) voltage doubling switched-cap harvester 320. In some embodiments, the harvested energy may be stored in a super-capacitor 350 ($V_{CAP}$). For example, the harvested energy can be stored on a 10 mF super-capacitor. The EH-PPM 300 also includes a plurality of fully integrated regulators that provide a plurality of rails with different supply voltages. For example, the EH-PPM 300 may include three fully integrated regulators 360 (including a switched cap regulator 370, an low dropout (LDO) regulator 380) that deliver i) about 0.5V subthreshold rail for the SoC core (i.e., digital) system, as well as the ULP analog front end; ii) about 1V rail for the SoC pads and the in-package sub-systems, including analog circuits, as well as off chip low power boot NVM and radio, and iii) about 1.8V rail to power sensing interfaces, off-chip sensors, boot NVM, etc. The regulators can be specifically designed to handle sub-µW loads and use load-dependent pulse frequency modulated control and nW-power error amplifiers, comparators, and reference generators to reduce their $I_{DDQ}$. Further, a power on circuit 390 can be used to effect a sequenced turn-on of the different regulators before enabling the rest of the system (i.e., SoC). In other words, the power on circuit 390 can follow a temporal order for enabling the plurality of rails providing different supply voltages to various components or blocks of the SoC. This is in particular useful to avoid a death loop where the system dies after or during recovery due to insufficient energy in the super-capacitor.

Figure 4:
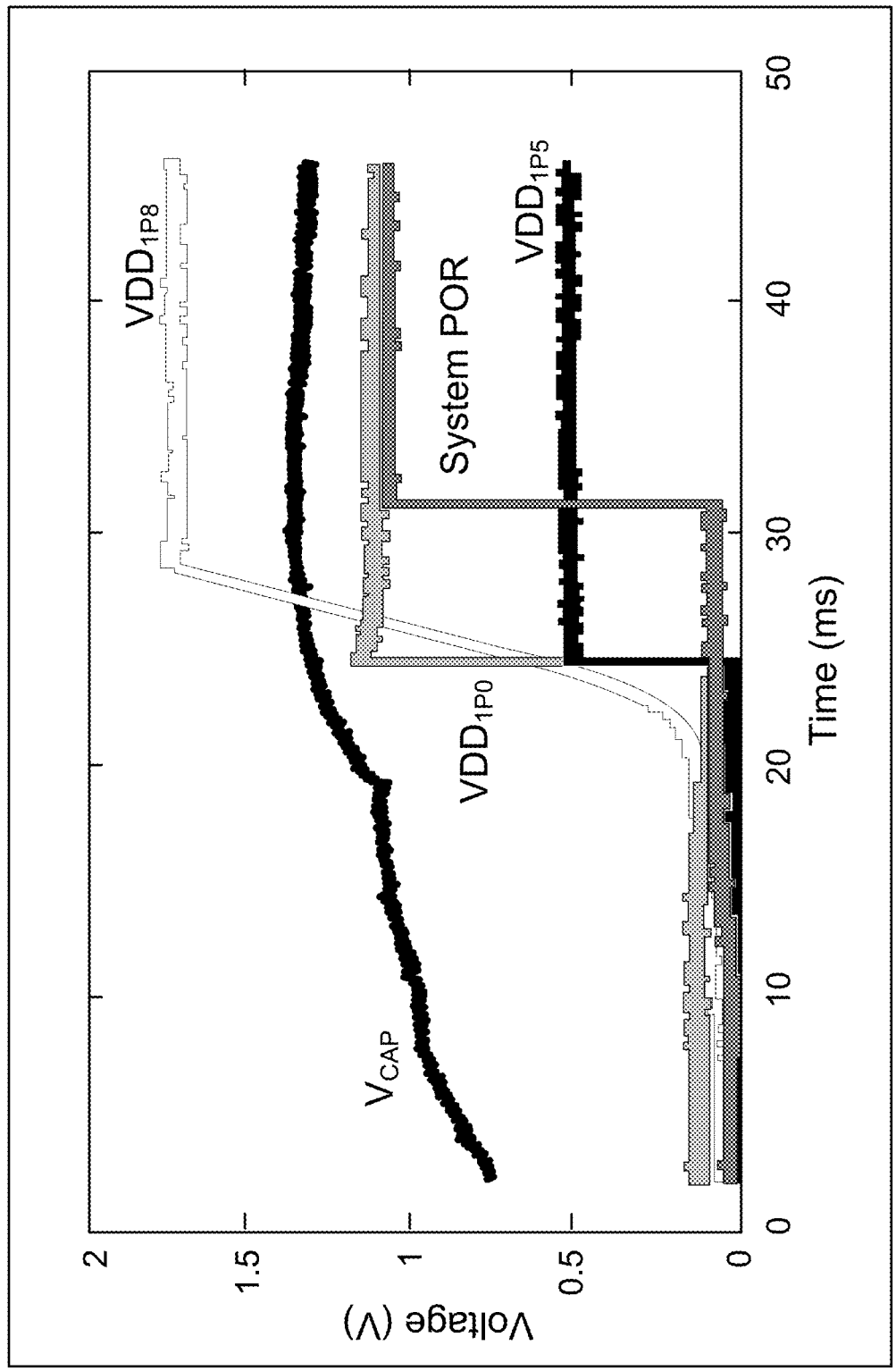
FIG. 4 shows an example illustration of a sequenced power up of different components of the SiP prior to system power-on-reset (POR), according to an embodiment.

Once the power rails are established and/or stable, the PM can then handle the startup of the system, keeping track of the available energy, controlling off-chip components and adjusting the power consumption of the system. FIG. 4 shows an example embodiment of harvesting of energy onto a 10 mF super-capacitor ($V_{CAP}$) from a harvesting transducer by the EH-PPM and the sequence power on different components via different power supplies (voltage rails). For example, once enough energy is available on $V_{CAP}$, the regulators ramp up the three rails starting with the 1.8V rail followed by the 1.0V rail and finally the 0.5V rail. Once all rails are stable, the startup circuit within the EH-PPM de-asserts the POR signal indicating it is safe to turn on the digital sub-system.

In some example embodiment, an EH-PPM achieved a peak end-to-end efficiency of about 71.1% while powering about 1 µW load. This EH-PPM employed a hybrid architecture including nW-quiescent power switched-capacitor DC-DC converters and low drop out (LDO) regulators, as well as a power-on-reset (POR) generator, and on-chip load switches that can be controlled by the user. The platform utilized a 1.3 nW gate-leakage-based voltage reference generator, operational from 0.5V, along with Pulse Frequency Modulation (PFM) control to further lower the quiescent power of the switching regulators. In the embodiment, the EH-PPM power-up controller controlled the power-up sequence of the whole platform to lower or minimize the current drawn and facilitate smooth startup.

To achieve a 1 µW or sub-µW power budget for this sub-system, a combination of approaches can be used including: 1) the LPC and instruction SRAM being tightly integrated to reduce the contribution of the SRAM to the power budget, 2) a coarse-grained reconfigurable data-flow architecture being introduced to optimize target applications, eliminate the need for a direct-memory access unit, reduce the required operating frequency without compromising the system's ability to perform the required application, and allow the LPC/SRAM to go into deep sleep for extended periods of time, and 3) on-the-edge processing and compression reduce the frequency of radio transmissions to reduce their contribution to the power budget of the system. The digital sub-system also employs traditional power saving techniques such as fine-grained power shutoff and clock gating to minimize the contribution of unused blocks to the power budget.

Figure 5A:
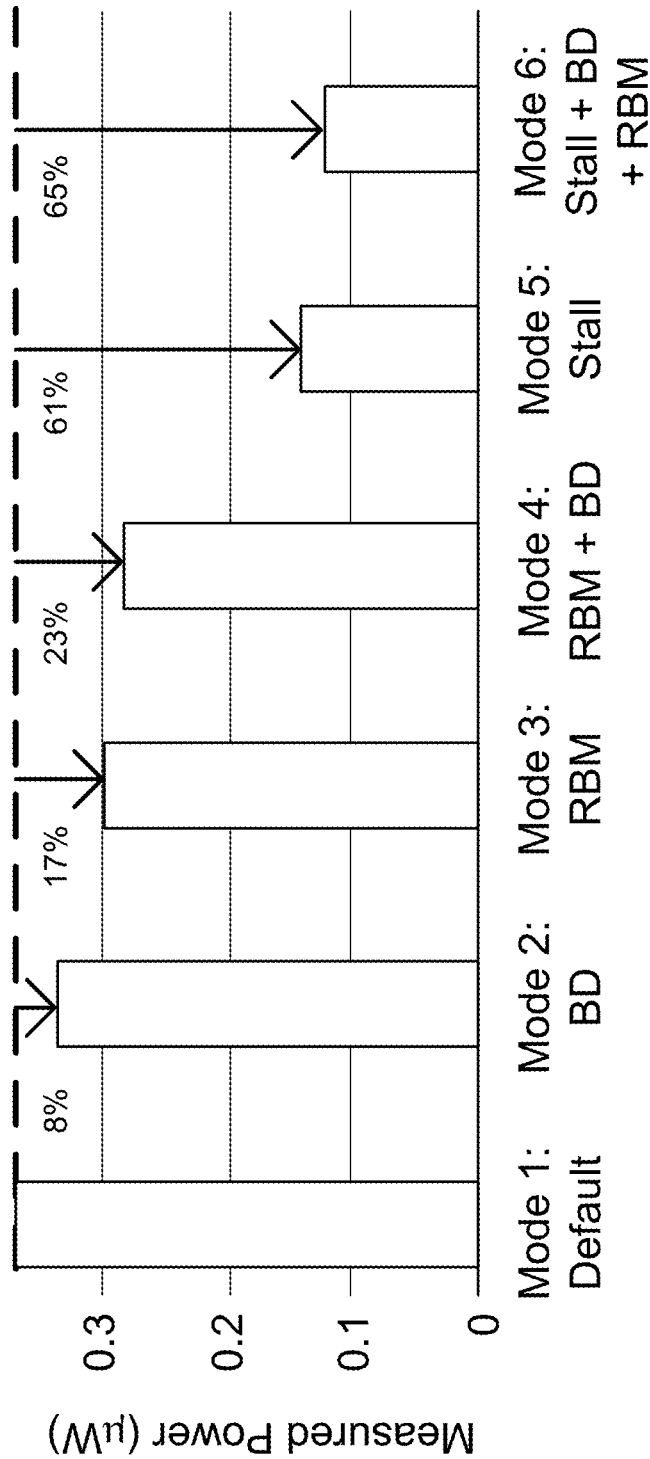
FIGS. 5A-B show example plots illustrating the reductions in power consumption due to low power operational modes of different components of the SoC, according to an embodiment.
Figure 5B:
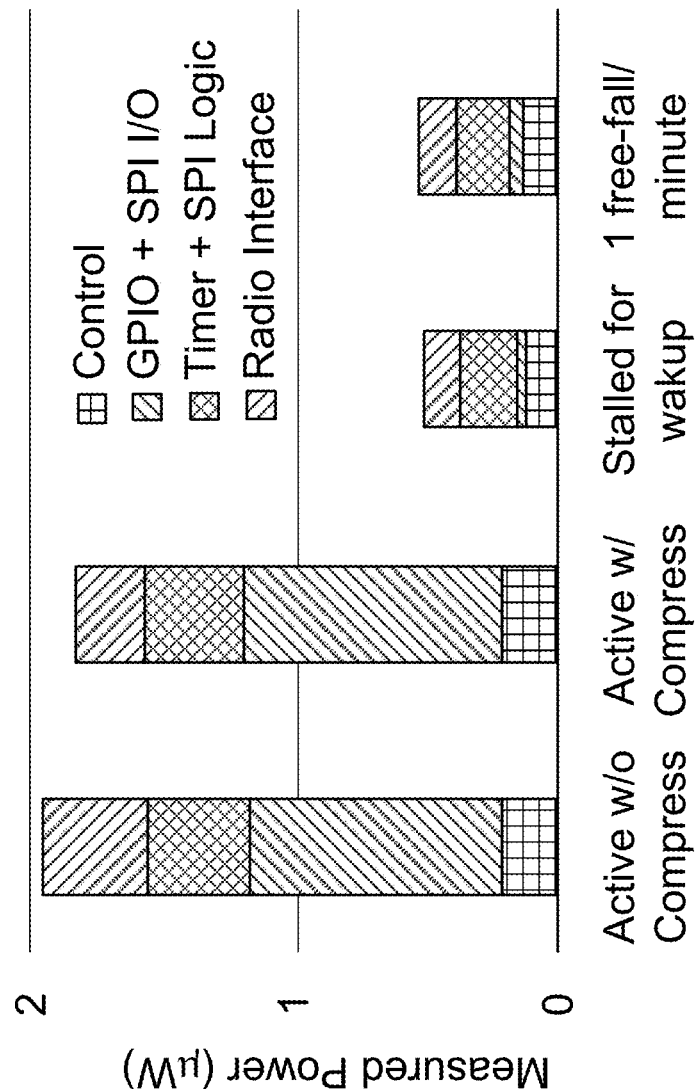

FIGS. 5A-B show example plots illustrating the reductions in power consumption due to tight integration of the LPC and SRAM (FIG. 5A) and low power operational modes of some components of the SoC (FIG. 5B), according to an embodiment. With reference to FIG. 5A, in some embodiments, the static random access memory (SRAM) and the low power controller (LPC) of the SoC can be tightly coupled or integrated to create various power saving modes. The SRAM may be designed for battery-less systems with its high-$V_T$ 8T ("eight transistor") bit-cell and myriad power saving techniques such as but not limited to disabling one or more SRAM banks, operating in read burst mode (RBM) and stalling. FIG. 5A shows the significant reduction in power consumption that may occur due to the LPC taking advantage of these SRAM features. In the example embodiment shown in FIG. 5A, SRAM features such as disabling a single bank of the SRAM, operating in RBM, operating in RBM while a single bank is disabled, stalling and all the mentioned features combined (single bank disabled plus stalling plus operating in RBM) can result in significant power consumption savings of about 8%, about 17%, about 23%, about 61% and 65%, respectively. These significant power consumption savings highlight the advantages due to the close integration of the LPC and the SRAM.

In some embodiments, the operations of the SoC can further be modified, and power consumption savings can be obtained with little or no effect on functionality by using custom codes to program the LPC (e.g., using LPC instruction set (with Python based assembler)). At the heart of the digital sub-system is the LPC and its ULP SRAM instruction memory. As noted above, the SRAM contains a myriad of power saving techniques to reduce its contribution to the power budget. These features include standby and shutdown modes to reduce the leakage power contribution, and a read burst mode to reduce active power consumption during program execution. The LPC is designed to be compact (only 1381 gates) and to tightly integrate with the instruction SRAM to make use of its power saving features. It is a two-stage pipelined processor implementing a custom instruction set architecture (ISA) shown in Table 1. This ISA and the available accelerators target IoT applications, and thus allow users to develop compact programs without sacrificing functionality. Reducing program size reduces the number of SRAM banks that must remain powered. Thus, the SHTDN instruction allows the programmer to completely shut down banks of unused SRAM to reduce power. The STALL instruction allows the users to put the system in a low power state while waiting for an event to occur. When a STALL instruction is issued, the LPC is automatically clock gated and the instruction SRAM is held in standby mode significantly cutting down the system's power consumption. Since the LPC uses a custom targeted instruction set, a python-based assembler is developed to translate assembly style instructions into programming data for the SoC.

TABLE 1

Instruction set of the LPC along with a description of their functionality.

| Instruction Type | Instructions | Description |
| --- | --- | --- |
| Low Power | NOP, STALL, SHTDN | STALL and SHTDN allow power control of instruction SRAM |
| Access | BUSW, BUSR, MOVL | Allow read/write to registers in the LPC and on the bus. |
| Branching | JMP, CJMP | Allow branching on external signals and accelerator status flags |
| Function call | SAVPC, RSTPC | Allow function calls by saying the PC address and restoring it. The DMEM is used as a hardware stack. |
| ALU | ADD, SUB, AND, OR, XOR, NOT, SHIFTL, SHIFTR, ROTL, ROTR | Allow ALU operations on 16-bit registers. |
| Status | STAT | Allows access to status flags related to the ALU |

FIG. 5B shows the power consumption of the SiP that transmits data about a free fall event as part of a shipping integrity tracker system. FIG. 5B shows the power breakdown of the digital sub-system during its active state after a free-fall event occurs with the compression enabled and disabled, and during its low power state waiting for the wakeup event. It is to be noted that the average digital power consumed assuming a pessimistic 1 free-fall event per minute is about 507 nW, a sub-µW power consumption level. For this application, the measured SoC power consumption from the super-capacitor including regulation and the off-chip sensor with no harvesting is about 20.6 µW ($V_{CAP}$=1.19V).

Besides the integration of the LPC and the instruction SRAM, the other aforementioned two approaches for achieving sub-µW power budget are having a coarse-grained reconfigurable data-flow architecture and on-the-edge processing and compression to reduce their contribution to the power budget of the system.

The Data-Flow Architecture

As discussed above, the SoC includes a number of accelerators that target ULP, low throughput applications. These include a MAC unit, an FIR filter, two timer units, a sensor data compression block, and a heart rate (RR) and atrial fibrillation (AFIB) block. In some embodiments, the power consumption of the system can be improved without compromising its flexibility with the use of a data-flow architecture in the SoC. The data-flow can be created by directly integrating the accelerators used by a sensing or communication interface with their corresponding interface. These data-flows act like an application specific integrated circuit (ASIC) independent of the LPC or bus, sensing, digitizing, processing, and transmitting data. This frees the LPC to either stall or perform other tasks. Since, in the digital sub-system of the SoC disclosed herein, the main contributor to the power consumption is the instruction SRAM and the LPC, the data-flow architecture allows the SoC to reduce its power consumption by offloading most of the processing and data transfer into the data-flow accelerators, which leads to reduced code size as well as reduced number of memory accesses. By stalling the LPC and its instruction SRAM until the data-flow accelerators complete their task, for example, an overall system power can be reduced for example by up to 65%.

This architectural choice also allows for a one-bus system without a direct memory access (DMA) interface and without loading the LPC with data transfers between blocks. For example, the RR-AFIB block can be integrated with the ECG analog front end (AFE), and the compression block can be integrated with the radio interface to create a health monitoring data-flow. In some embodiments, adding the data-flow paths may improve the number of cycles used to complete a given sensing task and may also reduce LPC and bus usage, allowing for either more tasks to be completed in a given time or reduced system clock frequency. In the case of a wearable, self-powered goal, an improved data-flow allows the SoC to lower the clock frequency to one which can be provided by a crystal at a low power. This facilitates the reduction of the system's power, decreasing the effective form factor through reduction in required super-capacitor size.

To maintain the flexibility of the system, the data-flow paths can be coarse-grained and/or reconfigurable. For example, the data-flow paths enabled or disabled through configuration bits, which highlights the advantages of the data-flow architecture by developing the same algorithm to either use or discard the data-flow paths. For example, two versions of a sensor data compression algorithm can be used, one that connects the compression block straight to the radio interface through the data-flow path, and the other uses the LPC/bus to transfer data between the compression block and the radio interface. In the latter, the compression block generates an interrupt when its internal buffer is full. The LPC then goes into an interrupt service routine (ISR) where the LPC reads the output of the compression block and moves the output of the compression block into the radio interface. In this example, the ISR adds at least 12 instructions into the code, and costs at least 16 cycles every time an interrupt is generated. Instead, the data-flow path reduces the code side by at least 12 instructions and avoids the need for the ISR completely, thus allowing the SoC to complete its task more efficiently, to go to sleep more often and with minimal overhead in area. This efficient execution can also facilitate the reduction in the clock rate of the system without compromising its flexibility.

On-the-Edge Processing and Compression

The wireless transmitter is an important component in ULP sensing systems that is inherently high power compared to other system components. Therefore, the transmitter typically either limits the system functionality by imposing strict duty cycle limitations, or limits the system lifetime by increasing the system power consumption. The SoC addresses transmitter power consumption by minimizing the amount of data that must be transmitted through both on-chip processing and compression of sensor data. The RR-AFIB accelerator processes ECG sensor data and is closely integrated with the AFE/ADC to limit or minimize its contribution to system power and reduce user overhead. It extracts the R-R intervals (heart rate) and analyzes the entropy between intervals to detect occurrences of atrial fibrillation events. The SoC can then transmit the R-R intervals or atrial fibrillation events instead of the raw ECG data, thus lowering or minimizing the amount of data that must be transmitted.

The compression accelerator can effectively compress ECG, acceleration, or any other type of sensor data that has a high degree of temporal correlation between consecutive samples. It is closely integrated with the radio interface to lower or minimize its contribution to system power and can be bypassed or enabled with a single configuration bit. It also has a special operating mode that allows it to effectively compress multiple data streams concurrently, such as 3-axis acceleration data. It implements the low-overhead lossless entropy compression algorithm (GAS-LEC), which was chosen to minimize the processing overhead of compression while maximizing the compression ratio. In some example embodiments, measured results show that it adds only about 4.4 nW processing overhead, reducing the required transmitter duty cycle by about 3.7×, and the entire system power by about 2.9× when the system is transmitting ECG at about 360 Hz sampling rate.

Figure 6A:
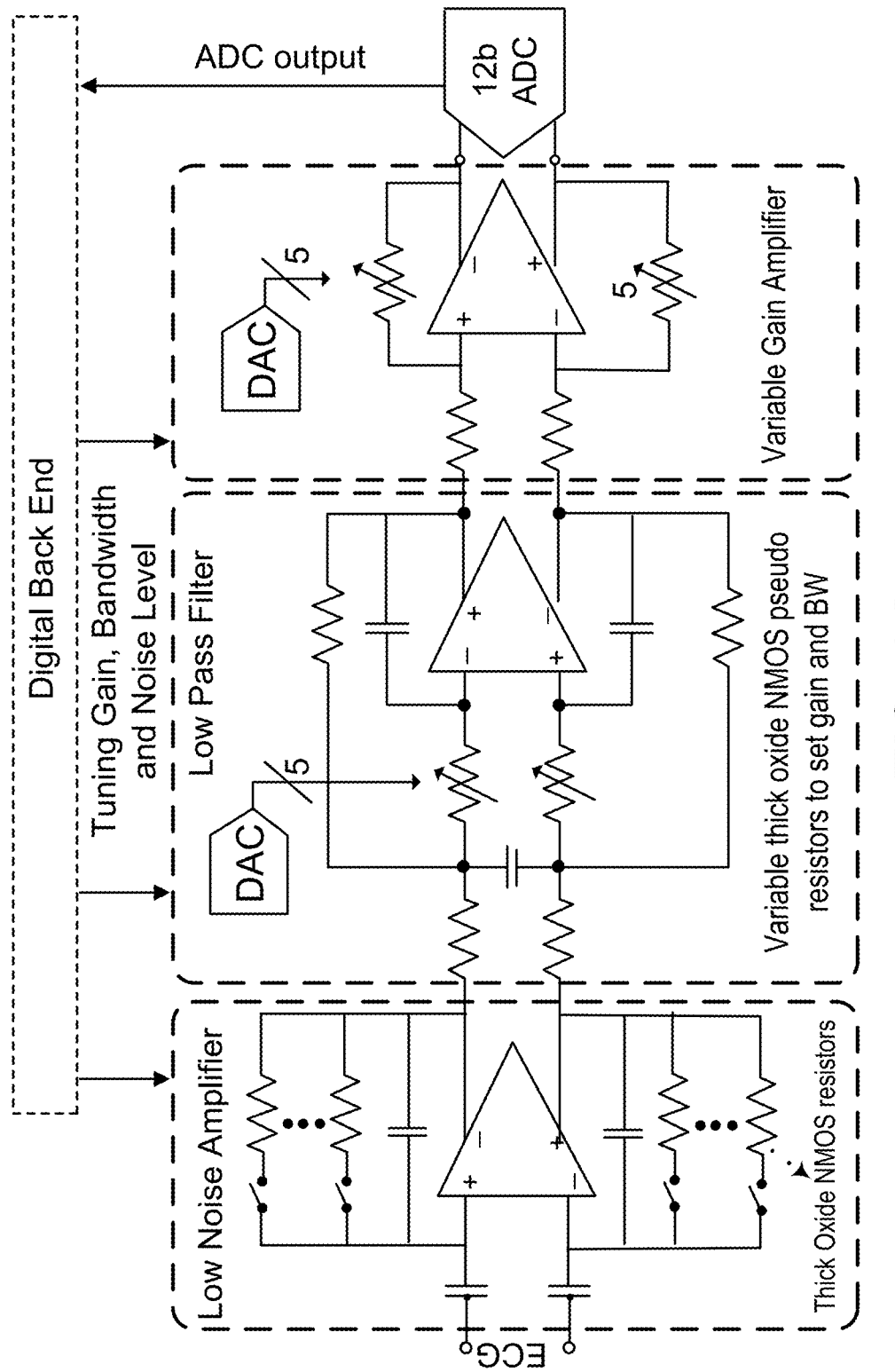
FIGS. 6A-B show example block diagrams of the sensing interface of the SoC including an analog front end (AFE) and an analog-to-digital converter (ADC), according to an embodiment.
Figure 6B:
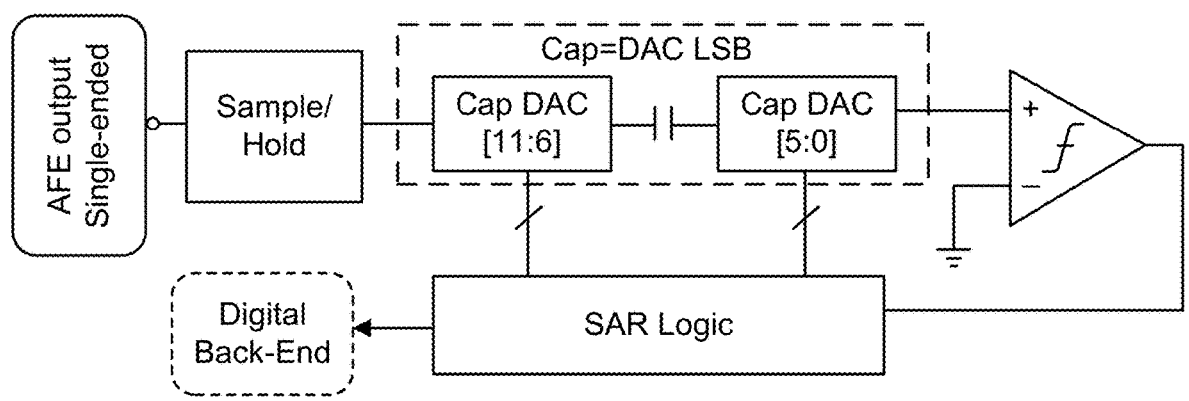

FIGS. 6A-B show example block diagrams of the sensing interface of the SoC including an analog front end (AFE) and an analog-to-digital converter (ADC), according to an embodiment. The SoC also includes an integrated AFE, followed by a 12-bit successive approximation register analog-to-digital converter (SAR ADC), for ECG signal acquisition. These applications benefit from a low input referred noise, on the order of a few μV rms, and a low bandwidth of <200 Hz. In this AFE, a careful low noise design methodology may lead to significant reduction of the flicker-noise corner, without the need for noise compensation techniques such as chopping. This reduces or eliminates the extra power overhead of chopping clock generation and the necessity to operate at higher frequencies.

With reference to FIG. 6A, in some embodiments, sub-threshold constant-gm references are used to provide the bias currents to the building blocks of the AFE, and the digital back-end is used to program the gain and bandwidth of the AFE. The ECG input signals are AC coupled to the low noise amplifier (LNA) and the ratio of the capacitors sets its gain. The tunable lower corner frequency of the amplifier is adjusted by selecting the pseudo-resistors in the feedback path of the LNA with 4-bit resolution. A multiple feedback topology is employed for the differential second order low pass filter which offers an increased dynamic range in the output. For area efficiency, the variable pseudo-resistors with fixed capacitors tune the upper corner frequency.

The current consumption as well as device dimensions and types of the first stage amplifier in the AFE can have the most impact on the input referred noise density. Therefore, to reduce flicker noise, the devices in the first stage LNA amplifier, which are biased in the sub-threshold region, are large gate area PMOS and NMOS devices. The following stages of the AFE may have negligible impact on the input referred noise, therefore the amplifiers are dimensioned for high gain and high linearity purposes. In some embodiments, the AFE can consume about 68.5 nW from about 0.5V supply, and delivers a programmable gain of about 31-52 dB and an input referred noise of about 2.8μ $V_{RMS}$. It also exhibits a noise efficiency factor of about 2.78 which is a reasonable value, and realizes a power efficiency factor of about 3.9 while maintaining a balanced power consumption to the input referred noise tradeoff.

With reference to FIG. 6B, in some embodiments, the AFE directly couples to the single ended SAR ADC, also designed for lower frequency signals used in personal health monitoring, for example. The ADC features a ground referenced comparator, removing the need for generating a reference. The design uses coupled metal capacitors for improved area efficiency, and operates at about 0.5V using high threshold devices for improved power efficiency. Two 6-bit capacitor banks are used to reduce area, with a small custom capacitor coupling the two banks to allow the LSB capacitor bank to match the least capacitance within the MSB bank. The down plate of each capacitor in the two banks connects to three analog pass-gates that are controlled by three digitally generated signals: sample, invert, and switch, respectively. Sample and invert are generated by a digital controller outside of the ADC, and switch is generated by the SAR ADC logic inside the ADC. The ADC is controlled by system clock and reset. Once the reset is disabled, the 12-bit parallel output will be available after 15 clock cycles, and the ADC continues sampling the input voltage and providing 12-bit output every 16 clock cycles.

Figure 7A:
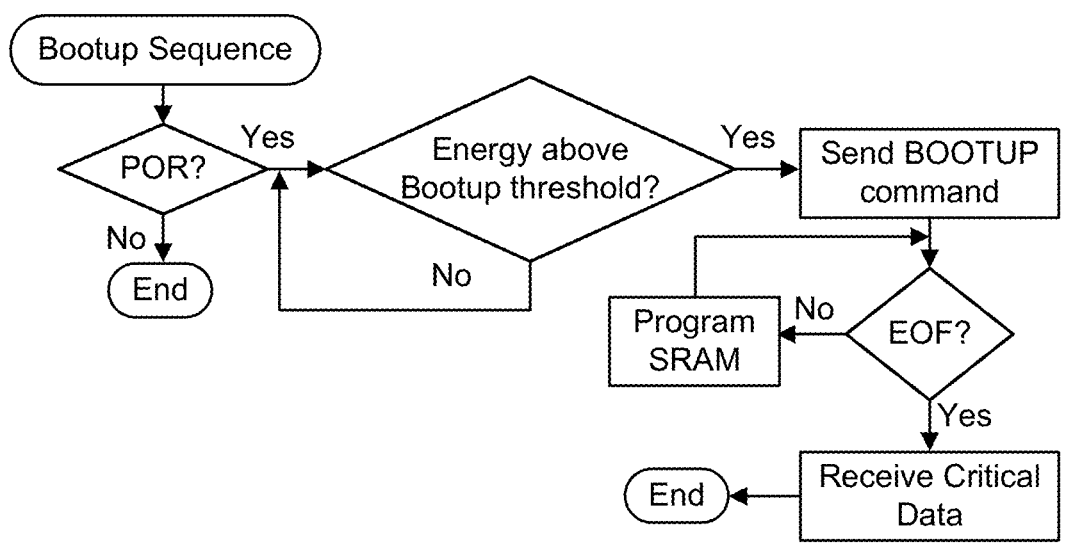
FIGS. 7A-B show example flowcharts illustrating a backup sequence (FIG. 7A) storing data at, and a bootup sequence (FIG. 7B) retrieving data from, an external memory coupled to the SoC before and after power loss, respectively, according to an embodiment.
Figure 7B:
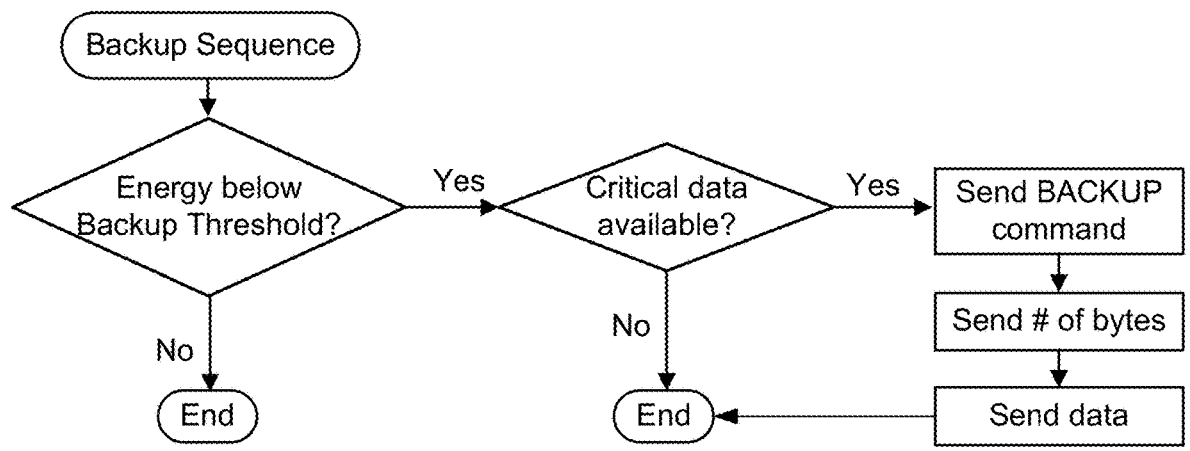
Figure 7C:
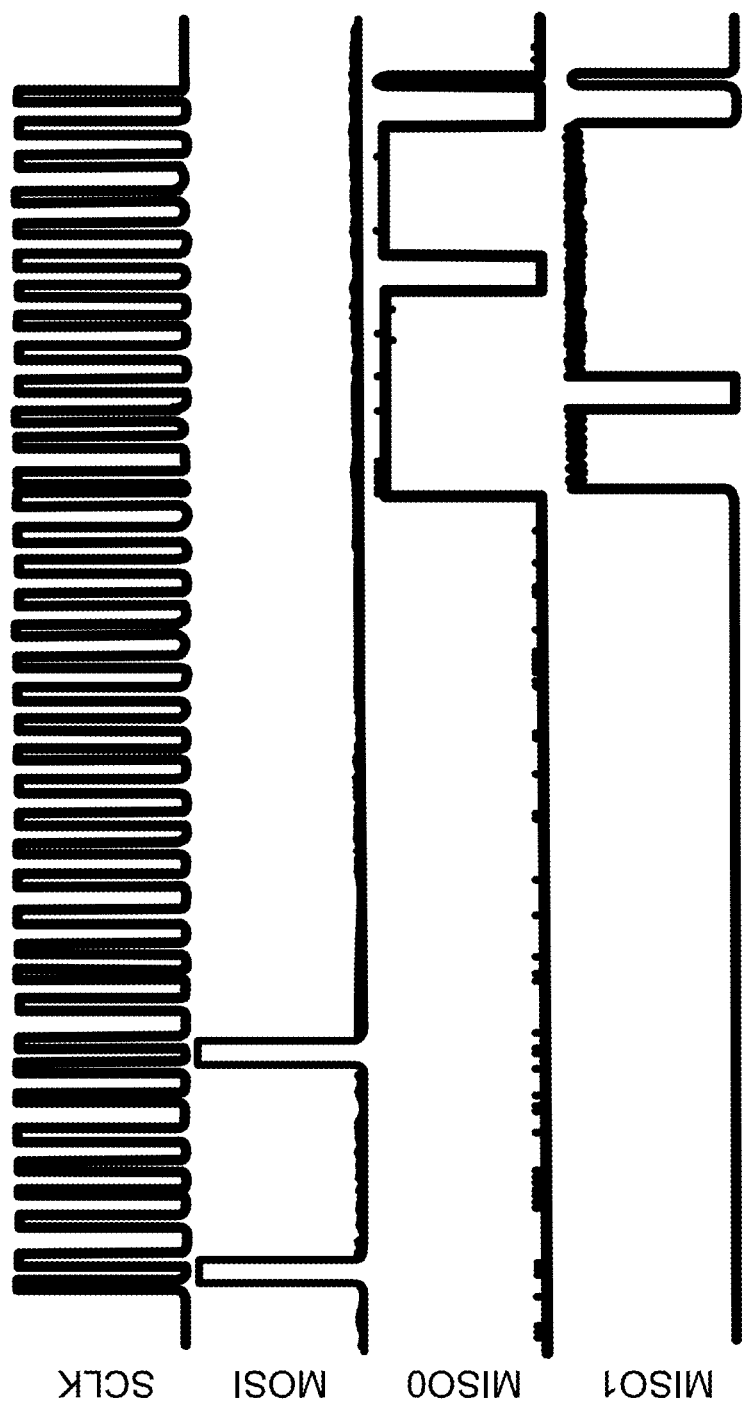
FIG. 7C shows example waveforms of a cold boot bus (CBB) during a bootup sequence of the SoC disclosed herein, according to an embodiment.

FIGS. 7A-B show example flowcharts illustrating a backup sequence (FIG. 7A) for storing data at, and a bootup sequence (FIG. 7B) for retrieving data from, an external memory coupled to the SoC before and after power loss, respectively, according to an embodiment. FIG. 7C shows example waveforms of a cold boot bus (CBB) during a bootup sequence of the SoC disclosed herein, according to an embodiment.

Integrating and managing NVM within a battery-less system budget can be challenging because of the inherent high power nature of most NVM technologies. Thus, an ULP in-package cold-boot bus (CBB) interfaces between the SoC and NVM. The CBB reduces the NVM's on time and the SoC boot-up time through bus parallelization, and avoids the overhead of generating a high frequency serial interface. Its reduced swing operation cuts down the communication cost, optimizing the NVM's integration within the SiP. To allow full recovery after a power-on-reset (POR), the PM instructs the CBMS to retrieve data from NVM when the available energy exceeds a boot-up threshold. The CBMS is also responsible for programming the SRAM instruction memory during boot-up, and backing up critical data before power loss. FIG. 7A shows am example flowchart of the bootup sequence. FIG. 7C shows the PM/CBMS bootup sequence through the CBB. For clarity only one of the 8 parallel data lines in the CBB is shown. The four depicted logic signals are the serial clock (SCLK), the master output slave input (MOSI), and two master output slave input (MISO0 and MISO1). After the CBMS programs the instruction SRAM, the LPC takes over the system performing the required application. During the bootup sequence, measured results show that the SoC consumes only 4.2 µW excluding the NVM (this power is mostly consumed by the CBMS and IMEM).

FIG. 7B shows am example flowchart of the backup sequence. Once the EH-PPM powers up, the PM and CBMS recover data from the NVM and program the on-chip memories. Since after power recovery the super-capacitor might not have enough charge to support the NVM, the CBMS is designed to enable the system to recover quickly and with minimal power overhead. At the same time, the PM ensures the SoC does not fall into a death loop where the system dies after or during recovery due to insufficient energy in the super-capacitor. The PM and CBMS also backup user data into the NVM when the system is close to losing power. These features allow the SoC to operate reliably in commercial applications.

The PM can be responsible for monitoring the energy available to the system by measuring $V_{CAP}$ on the super-capacitor (e.g., 350 in FIG. 3). To do that, the PM relies on a voltage-controlled ring oscillator (VCO) (not shown) that samples $V_{CAP}$ at a programmable frequency. In some embodiments, the VCO may be a part of the PM. And yet in other embodiments, the VCO may not be a part of the PM. Based on the state of the system and the available energy, the PM either manages the bootup sequence, backup sequence, or the digital power consumption. During the bootup sequence, the PM compares $V_{CAP}$ to a configurable safe bootup threshold before starting the CBMS. During this time, the PM holds the rest of the system in reset until the end of the bootup sequence. Once that concludes, the PM turns on the system, and monitors and controls its power consumption.

If $V_{CAP}$ drops below a user defined backup threshold, the PM starts the backup sequence. Once the PM enters that mode, a backup signal is sent as an interrupt to the main controller, allowing the system to backup critical data into the CBMS. The backup threshold is a value where the system risks power loss, but still contains enough energy for a full backup sequence. Since the backup operation occurs when the system is low on energy resources, the amount of data to be backed up should be kept to a minimum. Thus, in the system disclosed herein, the backup register file can be for example about 16 bytes long, which may be enough to store critical information for battery-less systems like key counter values, the number of AFIB events that occurred, number of free-falls, or number of wake-on-speech events for low power speech detection and recognition. The backup sequence copies this register file designated for backup into a backup FIFO within the NVM.

The CBMS is responsible for programming the SoC from the NVM and backing up any critical data before a power loss. FIG. 7A-B show the bootup and backup sequences of the CBMS. Once the PM detects that a backup is required or desirable, it signals the low power controller (LPC) to collect any critical data and send it to the CBMS. Once the LPC completes this data transfer, the CBMS powers on the NVM and sends a BACKUP command followed by the data to be saved. In some embodiments, after the data is stored or saved, the CBMS may power down or discontinue providing power to the NVM. In some embodiments, this may occur due to a power loss event. After a power loss event, the PM starts the bootup sequence. The CBMS powers on NVM, and retrieves the instruction memory first to program the SoC. An end-of-file (EOF) sequence signals the end of the instruction memory. Once the program EOF is reached, critical data is retrieved from a backup FIFO in the NVM and saved within the CBMS for the LPC to retrieve when the system starts. To conserve data, in some embodiments, after all the data is retrieved from the NVM, the CBMS may power down or discontinue providing power to the NVM, which reduces overall system power consumption.

Experimental Applications

To highlight the flexibility of the system, two example IoT applications are chosen: 1) shipping-integrity tracking (SIT) application through free-fall detection, and health monitoring application through ECG measurement, and 2) shipping-integrity tracking (SIT) application through free-fall detection. The first application highlights the low-power on-chip ECG AFE sensor and the SoC's ability to continuously monitor health within a microwatt-power processing power budget, while the second application highlights the advantages of the platform power manager and its ability to support off-chip commercial sensors. In the health monitoring application, the on-chip low power AFE/ADC is used to sample the ECG signal at a rate of about 100 Hz. The SoC first configures the AFE, and its interface generates an event upon a new sample. Once an event occurs, the LPC transfers data to the compression block that performs the compression and forwards the data to the radio FIFO through the custom data-flow or data-path. Once the radio FIFO is full, it generates an interrupt that notifies the LPC that a radio transfer is about to occur. The LPC then stalls until the data transfer is completed.

Figure 8B:
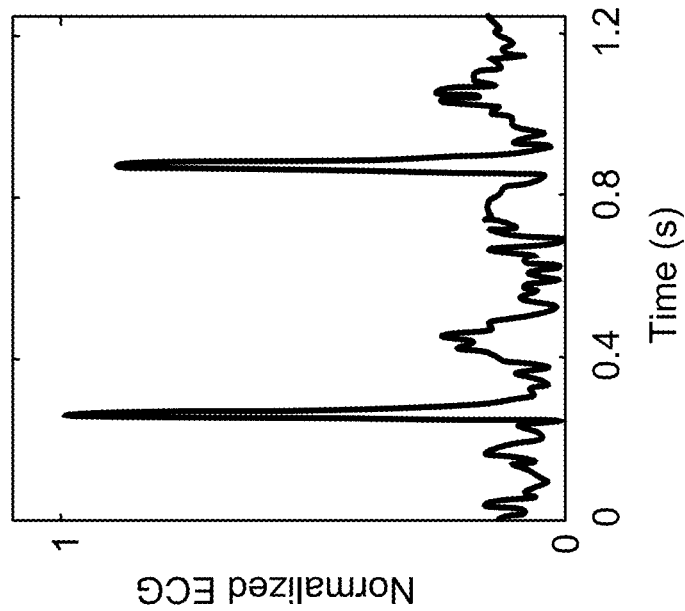
FIGS. 8A-B show example illustration of the power consumption (FIG. 8A) of the SoC disclosed herein during a sensing application of an electrocardiography (ECG) event (FIG. 8B), according to an embodiment.
Figure 8A:
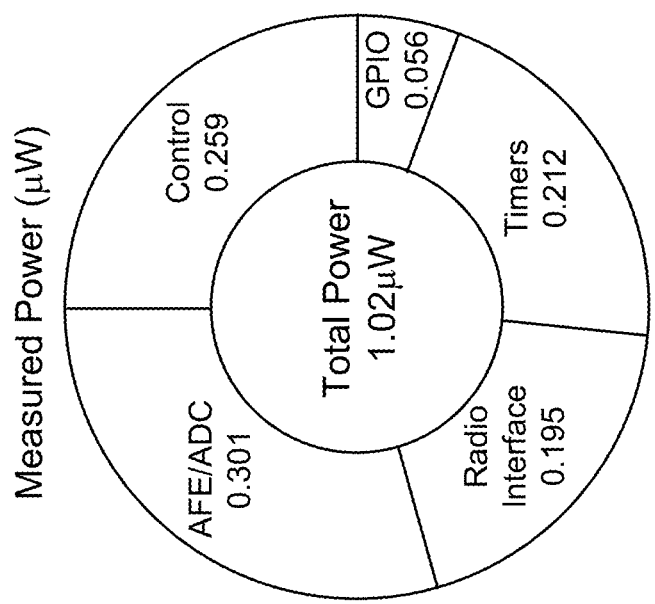

FIG. 8A shows, for the health monitoring application, the power breakdown of the digital sub-system along with the AFE/ADC along with the data transferred through the radio. FIG. 8B shows a profile of the measured streamed ECG data. The average power including the digital sub-system and the AFE is about 1.02 µM. For this application, the measured system power consumption from the super-capacitor including regulation with no harvesting is 5.98 µW ($V_{CAP}$=0.93V).

Figure 9:
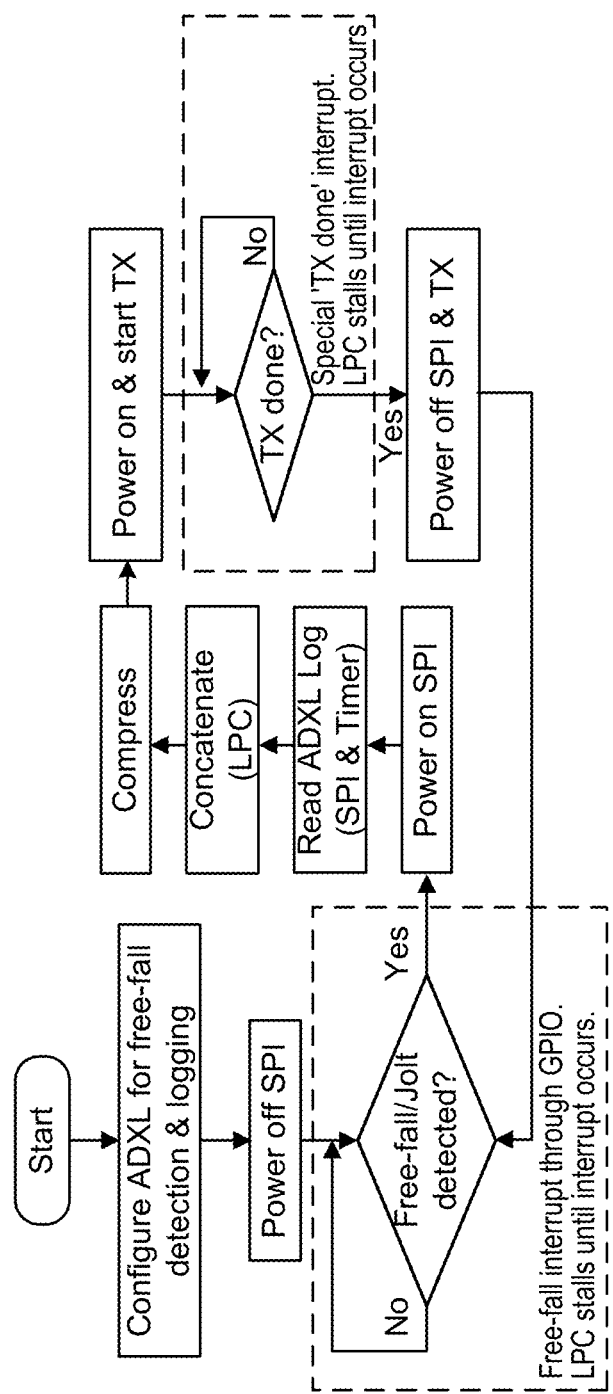
FIG. 9 shows an example flowchart illustrating an application of the SiP disclosed herein with respect to detection of a free fall event in a shipping-integrity tracking application, according to an embodiment.
Figure 10:
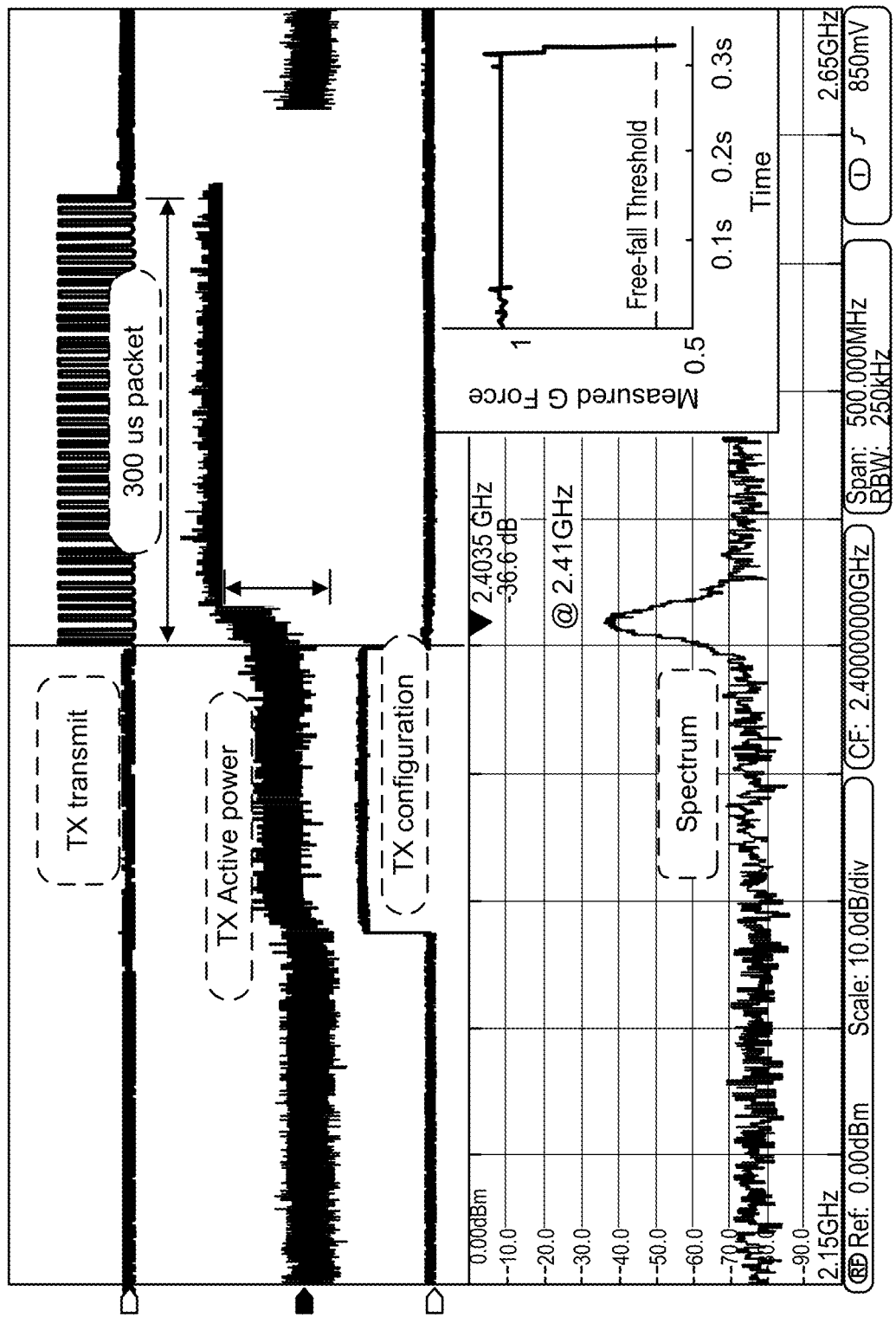
FIG. 10 shows an example plot illustrating an application of the SiP disclosed herein with respect to transmission of data in a shipping-integrity tracking application, according to an embodiment.

With reference to the SIT application, in some embodiments, FIG. 9 shows an example flowchart illustrating an application of the SiP disclosed herein with respect to detection of a free fall event in a shipping-integrity tracking application. In the SIT application, an off-chip commercial low power accelerometer (ADXL) is used to detect free-fall events. The serial peripheral interface (SPI) along with a GPIO event pin are used to communicate with the accelerometer. In the context of the SoC discussed so far, the accelerometer is an external sensor coupled to the SoC through the sensing interface of the SoC, the SPI. The SoC first configures the accelerometer through SPI to generate an event upon a free-fall detection. Once an event occurs, the SoC reads the free-fall data from the accelerometer and streams it to the FSK transmitter. For example, a general computation accelerator or an application specific accelerator (such as the compression block) may receive the data from the SPI and process (e.g., compress) it. The transmission of the data from the SPI to the accelerator may occur via a dedicated data path between the two that bypasses the system bus of the SoC. The compression block may be enabled to reduce the amount and frequency of transmissions. The transmission of the free-fall data from accelerator to the transmitter may also occur via a dedicated data path between the two that is established by the accelerator and bypasses the system bus. FIG. 10 shows measurements of the radio transmission via the radio transmitter of data related to the free fall event as obtained by the accelerometer.

By "tightly integrated," for example when referring to the integration between an onboard memory and a microcontroller, or between an accelerator and an interface, in some embodiments, it is to be understood that the integration refers to, amongst other things, the ability to form a direct data path between the memory and the microcontroller, or between the accelerator and the interface, such that the system bus can be avoided and energy consumption can be lowered. In some embodiments, "tight integration" may also refer to physical integration. For example, with respect to application specific computation accelerators such as compressors and communication interface (radio interface), the compressor may be part of the communications circuit that includes both the compression accelerator and the radio interface. This "tight integration" may in turn facilitate the formation of a custom data path between the accelerator and the interface.

While various embodiments have been described above, it should be understood that they have been presented by way of example only, and not of limitation. Likewise, the various diagrams may depict an example architectural or other configuration for the embodiments, which is done to aid in understanding the features and functionality that can be included. The disclosure is not restricted to the illustrated example architectures or configurations, but can be implemented using a variety of alternative architectures and configurations. Additionally, it should be understood that the various features and functionality described in one or more of the individual embodiments are not limited in their applicability to the particular embodiment with which they are described, but instead can be applied, alone or in some combination, to one or more of the other embodiments, whether or not such embodiments are described and whether or not such features are presented as being a part of a described embodiment. Thus the breadth and scope of the disclosure should not be limited by any of the above-described exemplary embodiments.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors.

The invention claimed is:

1. A system-on-a-chip (SOC), comprising:
   a microcontroller configured to select data and instructions from the SOC for off-chip storage when an amount of energy available for SOC operation is less than a threshold amount of energy; and
   a cold boot management system (CBMS) operatively coupled to the microcontroller and including a cold boot controller and a cold boot bus, the cold boot controller configured to:
   send the data and instructions to an external memory for off-chip storage during a backup sequence of the SOC; and
   retrieve at least some of the stored data and instructions from the external memory during a boot up sequence of the SOC, wherein the boot up sequence includes the cold boot controller retrieving one or more of the instructions, programming the SOC using the one or more of the instructions, and retrieving at least some of the data after programming the SOC,
   the cold boot controller configured to one or both of (1) send the data and instructions to the external memory and (2) retrieve the at least some of the stored data and the one or more instructions from the external memory, via the cold boot bus, and
   the microcontroller configured to enter a low power mode during at least a portion of one or more of the cold boot controller sending the data and instructions and the cold boot controller retrieving the at least some of the stored data and the one or more instructions.

2. The SOC of claim 1, further comprising a power management circuit configured to monitor the amount of energy available for operation of the SOC.

3. The SOC of claim 2, wherein the power management circuit is further configured to communicate with the CBMS thereby causing the CBMS to send the data and instructions to the external memory, or retrieve the at least some of the data and the one or more instructions from the external memory.

4. The SOC of claim 2, wherein the power management circuit is configured to select an energy consumption level of the SOC based on the amount of energy.

5. The SOC of claim 1, wherein the SOC is battery-less.

6. The SOC of claim 1, wherein the energy available for operation of the SOC is obtained from an energy harvesting transducer.

7. The SOC of claim 1, wherein the CBMS is configured to:
power the external memory prior to a start of the backup sequence;
discontinue providing power to the external memory after the data and instructions are saved by the external memory;
power the external memory prior to a start of the boot up sequence; and
discontinue providing power to the external memory after the at least some of the stored data and the one or more instructions are retrieved from the external memory.

8. The SOC of claim 1, further comprising an energy supply circuit including:
a plurality of outputs, each output from the plurality of outputs configured to provide a supply voltage to a component of the SOC and/or an off-chip component coupled thereto,
at least one supply voltage of the plurality of outputs being different from another supply voltage of the plurality of outputs.

9. The SOC of claim 1, wherein the amount of energy is a first amount of energy, the SOC further comprising an energy supply circuit including:
a plurality of outputs, each output from the plurality of outputs configured to provide a supply voltage to a component of the SOC and/or an off-chip component coupled thereto,
at least one supply voltage of the plurality of outputs being different from another supply voltage of the plurality of outputs, and
the CBMS configured to select i) which supply voltage to enable, and ii) a temporal order for enabling the selected supply voltages, during the boot up sequence based on a second amount of energy available for the boot up sequence.

10. The SOC of claim 1, further comprising:
a system bus, the microcontroller coupled to the system bus;
an interface configured to communicate with the microcontroller via the system bus, the interface configured to generate event data upon occurrence of an event; and
a computation accelerator configured to establish, based on an energy consumption level of the SOC, a first data path between the interface and the computation accelerator that at least partially bypasses the system bus such that the event data are transmitted to the computation accelerator via the first data path.

11. The SOC of claim 10, further comprising a radio interface configured to interface with a radio transmitter, wherein the computation accelerator is configured to establish, based on the energy consumption level of the SOC, a second data path between the computation accelerator and the radio interface that at least partially bypasses the system bus such that the event data, after processing by the computation accelerator, are transmitted to the radio interface via the second data path.

12. The SOC of claim 10, wherein the interface is configured for communication with one or more sensors, and wherein the event corresponds to receipt of one or more signals from at least one of the one or more sensors.

13. The SOC of claim 10, further comprising a radio interface configured to interface with a radio transmitter, wherein the computation accelerator is configured to process the event data by compressing the event data prior to sending the event data to the radio interface.

14. The SOC of claim 1, further comprising an energy supply circuit, the energy supply circuit including a first regulator configured to receive power from an energy-harvesting transducer, and a plurality of additional regulators, the first regulator and the additional regulators being configured to provide a plurality of different supply rail voltages.

15. The SOC of claim 14, wherein the first regulator is a boost converter.

16. The SOC of claim 14, wherein the energy supply circuit includes a maximum power point tracking circuit configured to track a maximum power point of the energy-harvesting transducer, and to operate the first regulator at the maximum power point with maximum power point tracking control.

17. The SOC of claim 14, wherein the CBMS is configured to enable the supply rail voltages according to a temporal sequence.

18. The SOC of claim 1, wherein the threshold amount of energy corresponds to at least a first amount of energy that is sufficient for the CBMS to conduct the backup sequence.

19. The SOC of claim 1, further comprising an interface configured to communicate with the microcontroller, the interface configured to generate event data upon occurrence of an event, at least a portion of the interface being configured for subthreshold operation.

20. A system-in-package (SiP), comprising:
the SOC of claim 1;
the external memory;
a radio transmitter; and
a radio interface configured to interface with the radio transmitter.

* * * * *